(12) United States Patent
Bentley et al.

(10) Patent No.: US 11,426,770 B2
(45) Date of Patent: Aug. 30, 2022

(54) SCRUB PLATE SYSTEM, VACUUM RAIL SYSTEM, CONTROL SYSTEM, IRREGULAR SURFACE CLEANING SYSTEM, PROCESS, AND METHODS OF USE

(71) Applicants: Todd Bentley, Amarillo, TX (US); James Brandon Brown, Amarillo, TX (US)

(72) Inventors: Todd Bentley, Amarillo, TX (US); James Brandon Brown, Amarillo, TX (US)

( * ) Notice: Subject to any disclaimer, the term of this patent is extended or adjusted under 35 U.S.C. 154(b) by 0 days.

(21) Appl. No.: 17/395,636

(22) Filed: Aug. 6, 2021

(65) Prior Publication Data
US 2021/0362201 A1 Nov. 25, 2021

Related U.S. Application Data

(63) Continuation-in-part of application No. 17/315,852, filed on May 10, 2021.

(60) Provisional application No. 63/157,803, filed on Mar. 7, 2021, provisional application No. 62/704,441, filed on May 11, 2020.

(51) Int. Cl.
*B08B 1/00* (2006.01)
*B08B 5/04* (2006.01)
*B08B 13/00* (2006.01)
*F03D 80/55* (2016.01)

(52) U.S. Cl.
CPC ............ *B08B 1/008* (2013.01); *B08B 1/005* (2013.01); *B08B 1/006* (2013.01); *B08B 5/04* (2013.01); *B08B 13/00* (2013.01); *F03D 80/55* (2016.05)

(58) Field of Classification Search
CPC combination set(s) only.
See application file for complete search history.

(56) References Cited

U.S. PATENT DOCUMENTS

| | | | | |
|---|---|---|---|---|
| 6,459,955 B1 * | 10/2002 | Bartsch | ................ | G05D 1/0274 318/587 |
| 2003/0233729 A1 * | 12/2003 | Tucker | ................ | A47L 11/4036 15/401 |
| 2007/0250212 A1 * | 10/2007 | Halloran | ................ | A47L 9/009 901/1 |

* cited by examiner

*Primary Examiner* — Erin F Bergner

(57) ABSTRACT

A scrub plate system, a vacuum rail system, and a control system for an irregular surface cleaning system, an irregular surface cleaning system, process, and methods of use are presented. The cleaning system presented herein is designed for clearing surfaces of structures. More specifically, but without limitation, the present cleaning system is designed and configured to clean the surfaces, inside and outside, of wind turbines and the corresponding structure. More specifically, and without limitation, the present disclosure relates to a surface cleaner for cleaning surfaces. More specifically, and without limitation, the present disclosure relates to cleaning surfaces of an irregular surface. More specifically, and without limitation, the present disclosure relates to cleaning a surface of an irregular surface where the target surface is at an inconvenient altitude or location.

19 Claims, 18 Drawing Sheets

SCRUB PLATE SYSTEM, VACUUM RAIL SYSTEM, CONTROL SYSTEM, IRREGULAR SURFACE CLEANING SYSTEM, PROCESS, AND METHODS OF USE

CROSS-REFERENCE TO RELATED APPLICATIONS

The present application claims priority to the U.S. Nonprovisional patent application Ser. No. 17/315,852 which was filed on May 10, 2021, which is hereby incorporated by reference herein in its entirety, including any figures, tables, or drawings.

The present application also claims priority to the U.S. Provisional Patent Application No. 62/704,441 which was filed on May 11, 2020 and U.S. Provisional Patent Application No. 63/157,803 which was filed on Mar. 7, 2021, which are hereby incorporated by reference herein in their entirety, including any figures, tables, or drawings.

FIELD OF THE DISCLOSURE

This disclosure relates to a scrub plate system, a vacuum rail system, and a control system for an irregular surface cleaning system, an irregular surface cleaning system, process, and methods of use. More specifically, and without limitation, the present disclosure relates to a surface cleaner for cleaning surfaces. More specifically, and without limitation, the present disclosure relates to cleaning surfaces of an irregular surface. More specifically, and without limitation, the present disclosure relates to cleaning a surface of an irregular surface where the target surface is at an inconvenient altitude or location.

COPYRIGHT NOTICE

At least a portion of the disclosure of this patent document contains material that is subject to copyright protection. The copyright owner has no objection to the facsimile reproduction by anyone of the patent document or the patent disclosure, as it appears in the Patent and Trademark Office patent files and/or records, but otherwise reserves all copyright rights whatsoever. The following notice applies to the software and data as described below and in the drawings that form a part of this document. Copyright. Optimum Rope Access Solutions. All rights reserved.

BACKGROUND OF THE DISCLOSURE

In recent times, advancements in technology, materials science, design, and human capabilities have created numerous wonderful structures, sculptures or artistic works, and advancements that benefit society. Many of these structures are very tall, such as the world's tallest building. Some of these structures have unique shapes such as "the bean" in Chicago. Other structures require cleanliness for functionality such as solar panels or solar farms. More structures require cleanliness for appearance such as wind turbines. More and more irregular shapes and/or tall, difficult to clean buildings and/or surfaces have appeared around the globe in recent times.

Cleaning the surfaces of these structures is a problem facing many building managers, owners, artists, architects, engineers and others. As structures grow in height, change in shape, or rely on cleanliness for performance, the cleanliness of a surface has dramatically increased in importance.

Pressure washing is a commonly used method of cleaning a surface. Pressure washing involves using a motor which runs on a fuel to pressurize water. The pressurized water then is shot through a hose and a pressure gun. In this way, the pressurized water is directed to strike a surface and remove contaminants. This method involves use of fuels and carbon dioxide to be released into the atmosphere. Similarly, this method comes with a great cost to pay for fuel, labor, and the like. Similarly, this method can cause damage to a surface due to the highly pressurized water. Similarly, this method requires large amounts of water and/or soap to be wasted. Similarly, this method does not include any type of collection, so water and/or soap and/or contaminants removed from the surface fall to the ground and can contaminate soil or other surfaces. These and many other problems such as safety and/or human labor issues arise with this most common form of surface cleaning.

Hand washing is one method of cleaning a surface that is used as a solution to the issues pressure washing may cause. Hand washing is also the only solution available in many circumstances, especially when it comes to urban structures and/or tall structures having surfaces at height. Pressure washing requires a water connection, among many other tools and equipment, while hand washing may be more mobile. Hand washing is laborious and requires a human or group of individuals to scale tall structures on occasion and the like.

Thus, there is a long-felt need in the art for a cleaning solution that can clear irregular surfaces. Similarly, there is a long-felt need in the art for a cleaning solution that can clean surfaces at various heights. Similarly, there is a long-felt need in the art for a cleaning solution that reduces water waste and human labor, and is environmentally friendly. Similarly, there is a long-felt need in the art for a cleaning solution which is safer for the individuals involved.

The disclosure herein provides these advantages and others as will become clear from the specification and claims provided.

SUMMARY OF THE DISCLOSURE

A scrub plate system, a vacuum rail system, and a control system for an irregular surface cleaning system, an irregular surface cleaning system, process, and methods of use are presented. More specifically, and without limitation, the present disclosure relates to a surface cleaner for cleaning surfaces. More specifically, and without limitation, the present disclosure relates to cleaning surfaces of an irregular surface. More specifically, and without limitation, the present disclosure relates to cleaning a surface of an irregular surface where the target surface is at an inconvenient altitude or location.

Said another way the present disclosure provides the state of the art with a scrub plate system including a switchable magnetic wheel embodiment, a vacuum system with a unique vacuum rail, and a control system for controlling and/or managing the irregular surface cleaning system, as well as a new overall irregular surface cleaning system embodiment.

Traditional surface cleaning processes such as hand washing and/or power washing and/or pressure washing waste large amounts of water, fuel, and can contaminate surrounding environments. In addition to wasting, these traditional methods of cleaning can cause damage to surfaces, removing coatings, discoloration, scratches, and the like. Similarly, traditional cleaning methods are slow and very labor intensive, and unsafe, sometimes causing injury, serious injury, and potentially death.

The present disclosure provides an irregular surface cleaning system, process, and method of use which solves these long felt problems plaguing the industry and more. The present disclosure provides a novel means of cleaning a surface, a surface that is irregular, and a surface that may be at a hard to reach vertical location and/or other locations which require cleaning and/or regular cleaning.

In the arrangement shown, and as one example, for ease of explanation, the present disclosure provides a means for cleaning the exterior and/or interior surfaces of a wind turbine tower. Wind turbine towers are one example of a structure which requires regular cleaning for maintenance and/or appearance and/or other purposes. Wind turbine towers contain a plurality of irregular surfaces, including but not limited to, gearboxes, mating surfaces, blades, cooling systems, hydraulic control systems, the top box, the tower itself, the interior of the tower, and more.

Wind turbine towers, as an example, require various fluids and lubricants for safe and effective operation. These fluids required for operation, in addition to dirt and other contaminants, can leak onto various surfaces of the structure and require cleaning for safe and effective operation and for the protection of the surface, to prevent decay, and the like. Cleaning these various surfaces is time consuming, labor intensive, and dangerous. Furthermore, cleaning these surfaces requires specialized access, equipment, and not only can be dangerous for those cleaning but also present dangers for the surroundings.

As another matter, traditional cleaning systems work from the top down. This means that the pressure washing system and a hand washing solution, traditional systems, require working from the top down. This is because water will streak downward as a user cleans in the traditional way. This means that in order to clean any section, all the lower sections must be cleaned as well. The present disclosure provides the state of the art with a bottom up cleaning approach for the first time. This approach, provides the state of the art, for the first time with the ability to clean sections, if desired. Said another way, this disclosure provides for isolated cleaning conditions, which is especially valuable when working at heights.

Thus, the present disclosure provides for elimination of chasing conditions. This novel feature, among other portions of this disclosure, provides huge advantages and improvements to traditional surface cleaning methods. In the example of a wind turbine tower, many leaks from wind turbines start at the top and only radiate or fall a short distance. For this reason, and in similar circumstances, the present disclosure provides unique solutions and novel functionality.

Thus, it is a primary object of the disclosure to provide a scrub plate system, a vacuum rail system, and a control system for an irregular surface cleaning system, an irregular surface cleaning system, process, and methods of use that provides novel functionality and improves upon the state of the art of surface cleaning.

Another object of the disclosure is to provide a scrub plate system, a vacuum rail system, and a control system for an irregular surface cleaning system, an irregular surface cleaning system, process, and methods of use that provides irregular surface cleaning.

Yet another object of the disclosure is to provide a scrub plate system, a vacuum rail system, and a control system for an irregular surface cleaning system, an irregular surface cleaning system, process, and methods of use that are environmentally friendly.

Another object of the disclosure is to provide a scrub plate system, a vacuum rail system, and a control system for an irregular surface cleaning system, an irregular surface cleaning system, process, and methods of use that reduces water waste.

Yet another object of the disclosure is to provide a scrub plate system, a vacuum rail system, and a control system for an irregular surface cleaning system, an irregular surface cleaning system, process, and methods of use that reduces surrounding environment pollution.

Another object of the disclosure is to provide a scrub plate system, a vacuum rail system, and a control system for an irregular surface cleaning system, an irregular surface cleaning system, process, and methods of use that provides a bottom up cleaning solution.

Yet another object of the disclosure is to provide a scrub plate system, a vacuum rail system, and a control system for an irregular surface cleaning system, an irregular surface cleaning system, process, and methods of use that provides for cleaning isolated conditions.

Another object of the disclosure is to provide a scrub plate system, a vacuum rail system, and a control system for an irregular surface cleaning system, an irregular surface cleaning system, process, and methods of use that provides cleaning solutions for delicate surfaces.

Yet another object of the disclosure is to provide a scrub plate system, a vacuum rail system, and a control system for an irregular surface cleaning system, an irregular surface cleaning system, process, and methods of use that provides time savings.

Another object of the disclosure is to provide a scrub plate system, a vacuum rail system, and a control system for an irregular surface cleaning system, an irregular surface cleaning system, process, and methods of use that provides cost savings.

Yet another object of the disclosure is to provide a scrub plate system, a vacuum rail system, and a control system for an irregular surface cleaning system, an irregular surface cleaning system, process, and methods of use that can be controlled remotely.

Another object of the disclosure is to provide a scrub plate system, a vacuum rail system, and a control system for an irregular surface cleaning system, an irregular surface cleaning system, process, and methods of use that does not require an umbilical.

Yet another object of the disclosure is to provide a scrub plate system, a vacuum rail system, and a control system for an irregular surface cleaning system, an irregular surface cleaning system, process, and methods of use that provides reduced fluid consumption.

Another object of the disclosure is to provide a scrub plate system, a vacuum rail system, and a control system for an irregular surface cleaning system, an irregular surface cleaning system, process, and methods of use that is a fully contained system.

Yet another object of the disclosure is to provide a scrub plate system, a vacuum rail system, and a control system for an irregular surface cleaning system, an irregular surface cleaning system, process, and methods of use that can run on a plurality of batteries.

Another object of the disclosure is to provide a scrub plate system, a vacuum rail system, and a control system for an irregular surface cleaning system, an irregular surface cleaning system, process, and methods of use that communicate wirelessly.

Yet another object of the disclosure is to provide a scrub plate system, a vacuum rail system, and a control system for an irregular surface cleaning system, an irregular surface cleaning system, process, and methods of use that recovers fluids applied to a surface.

Another object of the disclosure is to provide a scrub plate system, a vacuum rail system, and a control system for an irregular surface cleaning system, an irregular surface cleaning system, process, and methods of use that provides an operator interface.

Yet another object of the disclosure is to provide a scrub plate system, a vacuum rail system, and a control system for an irregular surface cleaning system, an irregular surface cleaning system, process, and methods of use that works with a smartphone or smart device.

Another object of the disclosure is to provide a scrub plate system, a vacuum rail system, and a control system for an irregular surface cleaning system, an irregular surface cleaning system, process, and methods of use that allows an operator to stay on the ground.

Yet another object of the disclosure is to provide a scrub plate system, a vacuum rail system, and a control system for an irregular surface cleaning system, an irregular surface cleaning system, process, and methods of use that includes onboard cameras.

Another object of the disclosure is to provide a scrub plate system, a vacuum rail system, and a control system for an irregular surface cleaning system, an irregular surface cleaning system, process, and methods of use that includes onboard scanners.

Yet another object of the disclosure is to provide a scrub plate system, a vacuum rail system, and a control system for an irregular surface cleaning system, an irregular surface cleaning system, process, and methods of use that provides a unique cleaning head architecture.

Another object of the disclosure is to provide a scrub plate system, a vacuum rail system, and a control system for an irregular surface cleaning system, an irregular surface cleaning system, process, and methods of use that distributes pressure on a surface.

Yet another object of the disclosure is to provide a scrub plate system, a vacuum rail system, and a control system for an irregular surface cleaning system, an irregular surface cleaning system, process, and methods of use that provide deflection mechanisms.

Another object of the disclosure is to provide a scrub plate system, a vacuum rail system, and a control system for an irregular surface cleaning system, an irregular surface cleaning system, process, and methods of use that provides for quick change features on various parts.

Yet another object of the disclosure is to provide a scrub plate system, a vacuum rail system, and a control system for an irregular surface cleaning system, an irregular surface cleaning system, process, and methods of use that can be manually or remote controlled.

Another object of the disclosure is to provide a scrub plate system, a vacuum rail system, and a control system for an irregular surface cleaning system, an irregular surface cleaning system, process, and methods of use that can be lowered on a tower.

Yet another object of the disclosure is to provide a scrub plate system, a vacuum rail system, and a control system for an irregular surface cleaning system, an irregular surface cleaning system, process, and methods of use that can run autonomously.

Another object of the disclosure is to provide a scrub plate system, a vacuum rail system, and a control system for an irregular surface cleaning system, an irregular surface cleaning system, process, and methods of use that tracks historical data.

Yet another object of the disclosure is to provide a scrub plate system, a vacuum rail system, and a control system for an irregular surface cleaning system, an irregular surface cleaning system, process, and methods of use that provides alerts.

Another object of the disclosure is to provide a scrub plate system, a vacuum rail system, and a control system for an irregular surface cleaning system, an irregular surface cleaning system, process, and methods of use that can disengage if communication to an operator is lost.

Yet another object of the disclosure is to provide a scrub plate system, a vacuum rail system, and a control system for an irregular surface cleaning system, an irregular surface cleaning system, process, and methods of use that can utilize global positioning systems.

Another object of the disclosure is to provide a scrub plate system, a vacuum rail system, and a control system for an irregular surface cleaning system, an irregular surface cleaning system, process, and methods of use that are easy to use.

Yet another object of the disclosure is to provide a scrub plate system, a vacuum rail system, and a control system for an irregular surface cleaning system, an irregular surface cleaning system, process, and methods of use that are safe to use.

Another object of the disclosure is to provide a scrub plate system, a vacuum rail system, and a control system for an irregular surface cleaning system, an irregular surface cleaning system, process, and methods of use that are accurate.

Yet another object of the disclosure is to provide a scrub plate system, a vacuum rail system, and a control system for an irregular surface cleaning system, an irregular surface cleaning system, process, and methods of use that can be used with various digital platforms.

Another object of the disclosure is to provide a scrub plate system, a vacuum rail system, and a control system for an irregular surface cleaning system, an irregular surface cleaning system, process, and methods of use that provides a user interface.

Yet another object of the disclosure is to provide a scrub plate system, a vacuum rail system, and a control system for an irregular surface cleaning system, an irregular surface cleaning system, process, and methods of use that are quick and efficient.

Another object of the disclosure is to provide a scrub plate system, a vacuum rail system, and a control system for an irregular surface cleaning system, an irregular surface cleaning system, process, and methods of use that are easy to program to various predetermined rule sets.

Yet another object of the disclosure is to provide a scrub plate system, a vacuum rail system, and a control system for an irregular surface cleaning system, an irregular surface cleaning system, process, and methods of use that are robust.

Another object of the disclosure is to provide a scrub plate system, a vacuum rail system, and a control system for an irregular surface cleaning system, an irregular surface cleaning system, process, and methods of use that saves time for a user.

Yet another object of the disclosure is to provide a scrub plate system, a vacuum rail system, and a control system for an irregular surface cleaning system, an irregular surface cleaning system, process, and methods of use that are high quality.

Another object of the disclosure is to provide a scrub plate system, a vacuum rail system, and a control system for an irregular surface cleaning system, an irregular surface cleaning system, process, and methods of use can dispense and dispose of a cleaning fluid.

These and other objects, features, or advantages of the present disclosure will become apparent from the specification and claims.

DETAILED DESCRIPTION OF THE DISCLOSURE

Figure 1:
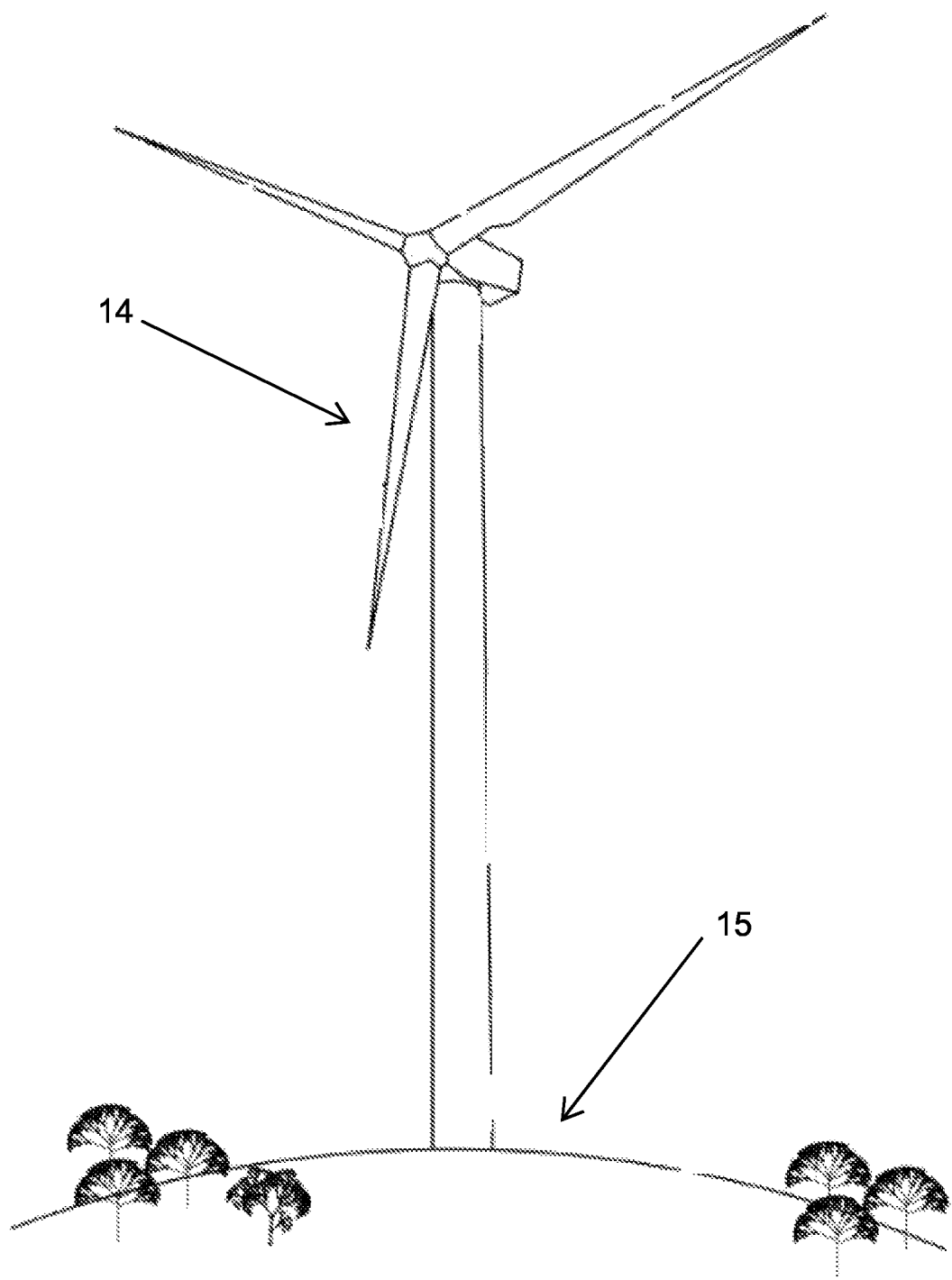
FIG. 1 is a perspective illustration showing part of the system as shown; the view showing a structure; the view showing a wind tower as an example of a structure; the view showing a wind turbine; the view showing surroundings.
Figure 2:
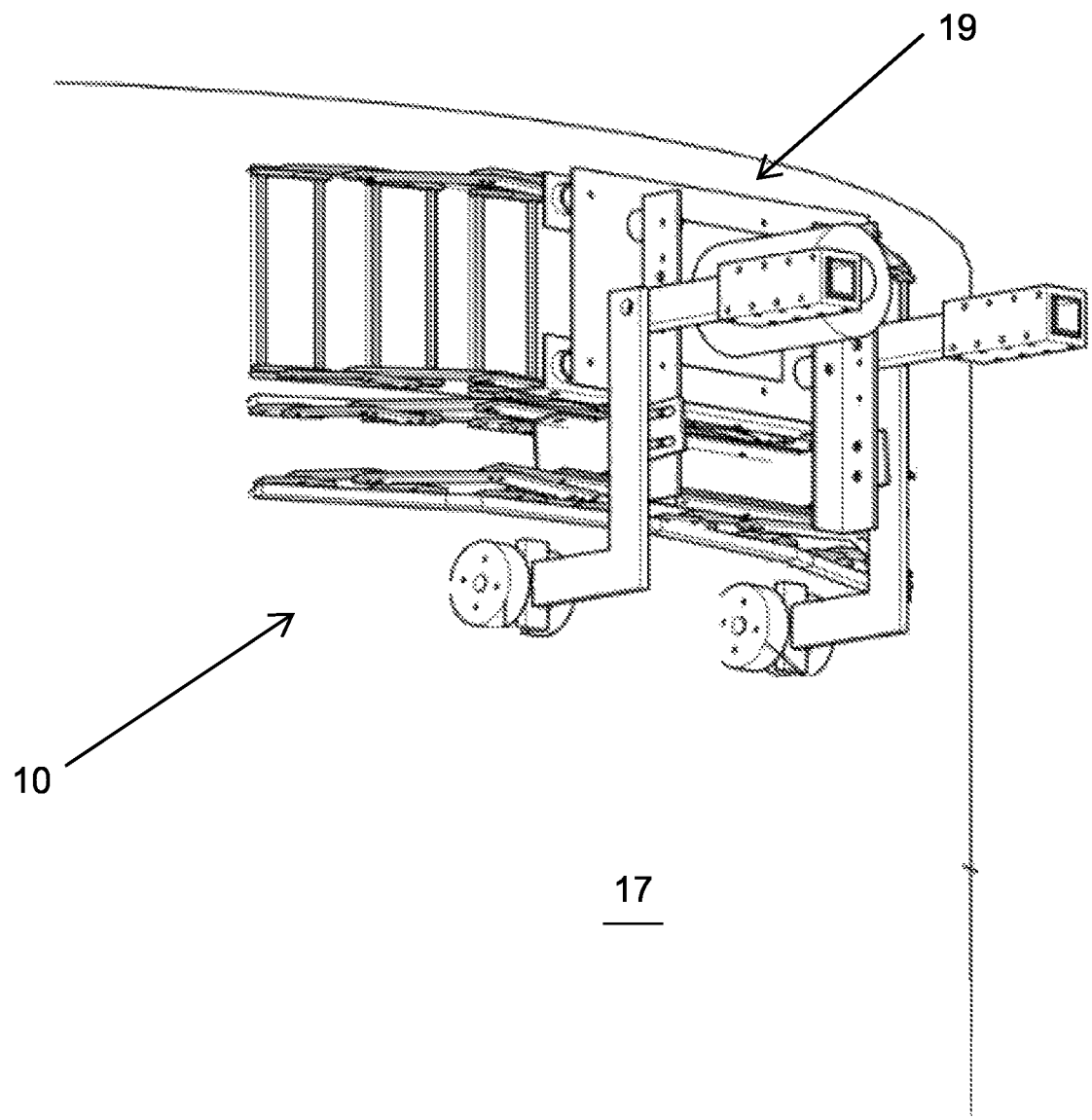
FIG. 2 is a bottom, perspective view of an alternative embodiment as shown; the view showing an alternative system; the view showing the system engaged with a surface of a structure.
Figure 3:
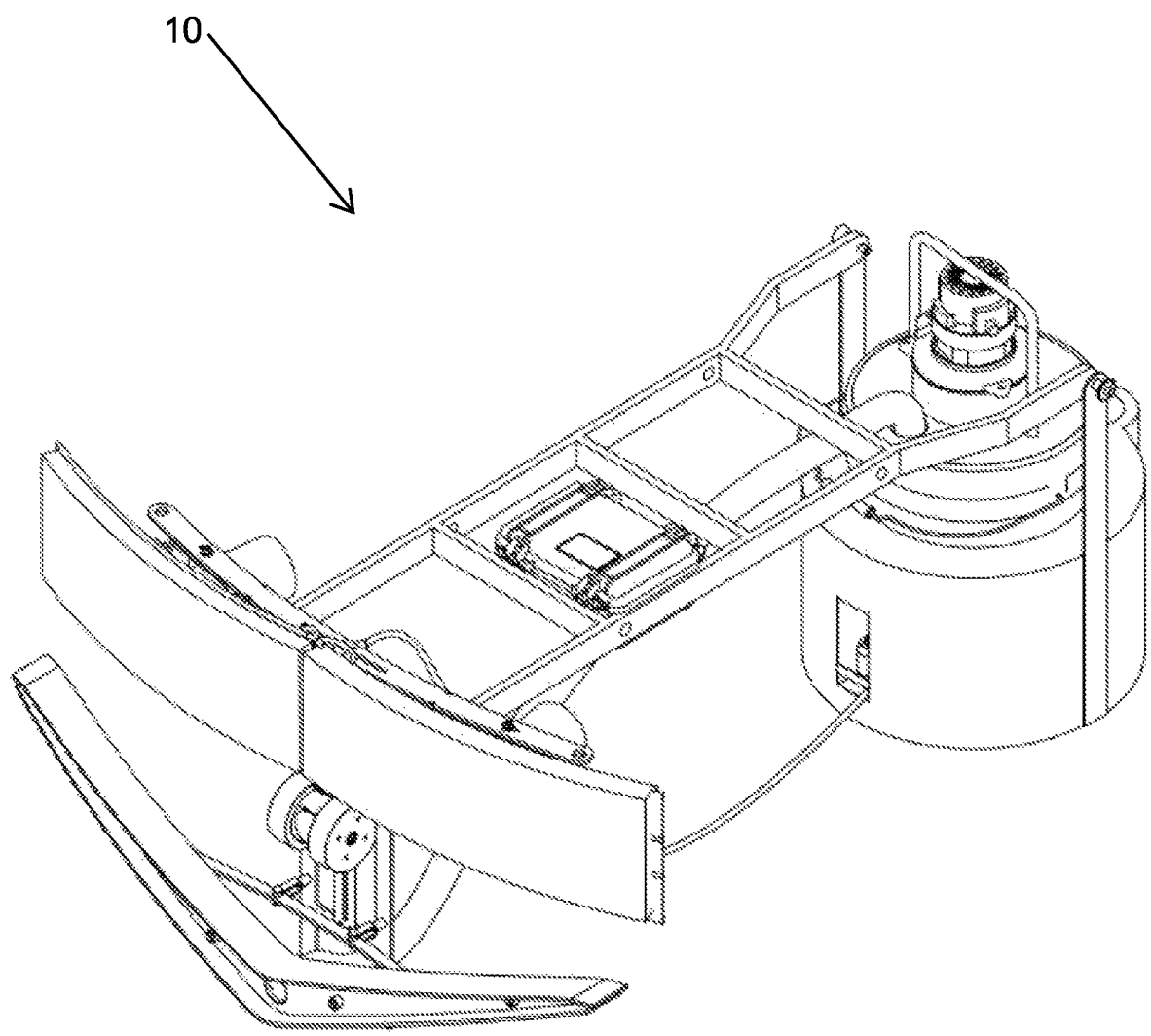
FIG. 3 is a top, perspective view of the system; the view showing a scrub head assembly; the view showing a collector assembly; the view showing a switchable magnetic wheel, the view showing an applicator; the view showing a frame; the view showing a frame supporting an onboard computing system; the view showing a frame supporting various components of the system; the view showing a vacuum hose assembly; the view showing a collection and storage tank.

In the following detailed description, reference is made to the accompanying drawings which form a part hereof, and in which is shown by way of illustration specific embodiments in which the disclosure may be practiced. These embodiments are described in sufficient detail to enable those skilled in the art to practice the disclosure, and it is to be understood that other embodiments may be utilized and that mechanical, procedural, and other changes may be made without departing from the spirit and scope of the disclosure (s). The following detailed description is, therefore, not to be taken in a limiting sense, and the scope of the disclosure(s) is defined only by the appended claims, along with the full scope of equivalents to which such claims are entitled.

As used herein, the terminology such as vertical, horizontal, top, bottom, front, back, end, sides and the like are referenced according to the views, pieces and figures presented. It should be understood, however, that the terms are used only for purposes of description, and are not intended to be used as limitations. Accordingly, orientation of an object or a combination of objects may change without departing from the scope of the disclosure.

Reference throughout this specification to "one embodiment," "an embodiment," "one example," or "an example" means that a particular feature, structure, or characteristic described in connection with the embodiment or example is included in at least one embodiment of the present disclosure. Thus, the appearance of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium.

Any combination of one or more computer-usable or computer-readable media may be utilized. For example, a computer-readable medium may include one or more of a portable computer removable drive, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code, or virtual code, or framework code suitable for the disclosure herein, or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("Saas"), Platform as a Service ("PaaS"), and Infrastructure as a Service ("IaaS")), and deployment models (e.g., private cloud, community cloud, public cloud, and hybrid cloud).

The flowchart and block diagrams in the attached figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

In the arrangement shown, as one example, an irregular surface cleaning system, process, and method of use are presented. Irregular surface cleaning systems are formed of any suitable size, shape, and design and are configured to fulfill the goals of the disclosure as described herein. More specifically, and without limitation, the present disclosure relates to a surface cleaner for cleaning surfaces. More specifically, and without limitation, the present disclosure relates to cleaning surfaces of an irregular surface. More specifically, and without limitation, the present disclosure relates to cleaning a surface of an irregular surface where the target surface is at an inconvenient altitude or location.

In the arrangement shown, as one example, the irregular surface cleaning system provides a unique cleaning system, process, and method of use which solves long felt problems plaguing the industry, and more. The present disclosure provides a novel means of cleaning a surface, a surface that is irregular, and a surface that may be at a hard to reach vertical location and/or other locations which require cleaning and/or regular cleaning.

In the arrangement shown, and as one example, for ease of explanation, the present disclosure provides a means for cleaning the exterior and/or interior surfaces of a wind turbine tower. Wind turbine towers are a great example of a structure which requires regular cleaning for maintenance and/or appearance and/or other purposes. Wind turbine towers contain a plurality of irregular surfaces, including but not limited to, gearboxes, mating surfaces, cooling systems, hydraulic control systems, the top box, the tower itself, the interior of the tower, and more.

Wind turbine towers, as an example, require various fluids and lubricants for safe and effective operation. These fluids required for operation, in addition to dirt and other contaminants, can leak onto various surfaces of the structure and require cleaning for safe and effective operation and for the protection of the surface, to prevent decay, and the like. Cleaning these various surfaces is time consuming, labor intensive, and dangerous. Furthermore, cleaning these surfaces requires specialized access, equipment, and not only can be dangerous for those cleaning but also present dangers for the surroundings.

As another matter, traditional cleaning systems work from the top down. This means that the pressure washing system and a hand washing solution, traditional systems, require working from the top down. This is because water will streak downward as a user cleans in the traditional way. This means that in order to clean any section, all the lower sections must be cleaned as well. The present disclosure provides the state of the art with a bottom up cleaning approach for the first time. This approach provides the state of the art, for the first time with the ability to clean sections, if desired. Said another way, this disclosure provides for isolated cleaning conditions, which is especially valuable when working at heights.

Some of this data capture includes, but is not limited to capturing images, object recognition within images, counting of objects within images, combined with location, spatial geometries, historical data including location of regular anomalies, and other information can be used to create customized information, identify patterns, and more.

System:

With reference to the figures, a scrub plate system, a vacuum rail system, and a control system for an irregular surface cleaning system, an irregular surface cleaning system, process, and methods of use 10 are presented. Irregular cleaning system, process, and method of use 10 (hereafter referred to as "irregular surface cleaning system", "irregular cleaning system", "surface cleaning system", "cleaning system", or simply "system") is formed of any suitable size, shape and design.

In the arrangement shown, as one example, irregular surface cleaning system 10 may comprise remote servers, databases, application servers, application databases, product databases, mobile applications, and/or computers; all of which in continuity or as separate acts fulfill the functions disclosed herein. irregular cleaning system 10 also includes, in the embodiment(s) depicted, a graphical user interface, a structure 14, a structure footprint 15, an obstacle, a surface 17, a user, a sensor system 19, a computing system, a communication and/or control system, an application server, and a mobile computing application, among other components, features, and functions.

In the arrangement shown, as one example, the main structure of system 10 also includes a shroud, a main body 30, a power supply, a wash tank 70, a vacuum system 80, a head assembly 100, a plurality of attachments 210, a plurality of wired connections, a plurality of sensors, an onboard computing system 240, and communication and control components, among other components, features, and functionality.

Graphical User Interface:

In the arrangement shown, as one example, system 10 may include a graphical user interface. Graphical user interface is formed of any suitable size shape and design and is configured to allow a user to view interact with, manipulate, and visually access environmental and system data and information, information related thereto, and/or view various data for various surfaces and/or environments and/or add information to an cleaning system and/or environment and/or add information about a surface and/or object data and/or change the settings of the sensors and/or change the settings of the cleaning system operation.

Graphical user interface is an exemplary method by which systems of the present disclosure may clean a surface remotely and/or make programming changes to the operation of system 10. Employing graphical user interface, enhances a user's interactions with system 10 in the form of awareness and knowledge of data within the system 10. System 10 provides direct links to a user's history, settings, programming, and other information related to a particular structure and/or a particular job and/or a particular client and/or a particular surface. In this way graphical user interface provides for a means for a user to make adjustments to the operation and functionality of system 10. Additionally, graphical user interface provides direct interaction with the cleaning system, geometrical measurements, objects, system speed, system trajectory, and more. Additionally, local geographic information with relation to the system can be added, viewed, or retrieved.

Display of Graphical User Interface: In the arrangement shown, as one example, system 10 includes a graphical user interface. Graphical user interface may include a display, which is configured to show and display information, including data, for review and interpretation by a user or plurality of users, or a plurality of users interacting with one another. In the arrangement shown, as one example, interactive user display is formed of a display screen, such as that of a desktop computer, laptop computer, monitor, tablet, smart phone, smart TV, projector, virtual reality display or any other device or form of a display. In the arrangement shown, as one example, interactive user display comprises a series of interactive user display pages, however, the interactive user display may consist of a single page or any other method of displaying information on a display as could be adapted to various size screens, devices, or user preferences. The interactive user display can display various patient and/or medical information which is retrieved and/or requested.

Structure:

In the arrangement shown, as one example, system 10 includes a structure 14. Structure 14 is formed of any suitable size, shape, and design. In the arrangement shown, as one example, a structure 14 is defined as an erected structure in which a user or plurality of users desires to clean. This structure may include a structure footprint 15 (or simply "footprint"). The footprint 15 is generally measured in terms of ground space and/or square footage. Structure 14, in the arrangement shown, can be assigned a geometric measurement. For example, a structure 14 may measure from the ground, vertically a number of feet, or include a surface 17 which has an area of square feet.

As a few examples of a structure 14, a structure may be a building which is erected for inhabitants such as a commercial or residential or industrial building. A structure 14 may be an art installation such as a sculpture. A structure 14 may be a subway car or subway channel. A structure 14 may be a solar array having a plurality of solar panels. A structure may be a wind turbine having a foundation, tower, nacelle, rotor, rotor hub, and blades. A structure may be a bridge or other civil engineering structure. A structure may be a monument, such as a historical monument which requires preservation of surfaces. These are some examples of structures. Other examples which have surfaces that may need cleaned are also hereby contemplated for use.

Similarly, a structure may also have a plurality of obstacles and a plurality of surfaces 17.

User (or Plurality Thereof):

In the arrangement shown, as one example, system 10 includes a user. User may be any user interacting with or utilizing the system 10. This may include viewing, controlling, analyzing, manipulating, and/or interacting with system 10. User is not limited to a single user but may be a plurality of users.

Cleaning Vehicle:

In the arrangement shown, as one example, system 10 includes a cleaning vehicle 19. Cleaning vehicle 19 is formed of any suitable size, shape, and design and is configured as the primary cleaning system of the overall system 10. In this way, and in the arrangement shown, as one example, cleaning vehicle 19 is deployed to clean a surface. Cleaning vehicle 19 can function both autonomously and manually. Cleaning vehicle 19 is further described herein.

Shroud:

In the arrangement shown, as one example, cleaning vehicle 19 may include a shroud. Shroud (also referred to as "cover") is formed of any suitable size, shape, and design and is configured to enclose system 10 and protect the various components of system 10 from environmental elements such as wind, moisture, sun, and the like. Said another way, shroud is configured to house and/or cover the various components and/or features of system 10.

In the arrangement, shown as one example, cover extends from a front end to a rear end between opposing sides. The shroud includes a top and may also include a bottom. In the arrangement shown, as one example, the cover is generally thin in shape for weight and includes an exterior surface which is viewable from the outside and an interior surface which is closer to the components of the cleaning vehicle 19 of system 10.

In the arrangement shown, as one example, cover also includes a plurality of apertures. Plurality of apertures are formed of any suitable size, shape, and design and are configured to allow for various components, hoses, connections, intakes, to cross the shroud from the hollow interior of the cover to the exterior environment or from the exterior environment to the hollow interior.

In this way, the plurality of apertures may vary from a single aperture to many, as is needed depending on various components included and functionality. Similarly, system 10 may have zero plurality of apertures. The plurality of apertures may also vary in size and may be formed to fit in close and tight tolerances so as to protect the various components of cleaning vehicle 19 of system 10 from the elements such as precipitation and the like. Similarly, cleaning vehicle 19 may have a large front aperture to engage with the surface 14 of the structure 17. In this way, the front aperture may be small enough for engagement, and in another embodiment, as is shown as an example, may be completely open. Said another way, cover does not extend on the front end but instead cleaning vehicle 19 is completely open on this side, which engages surface 14.

Figure 4:
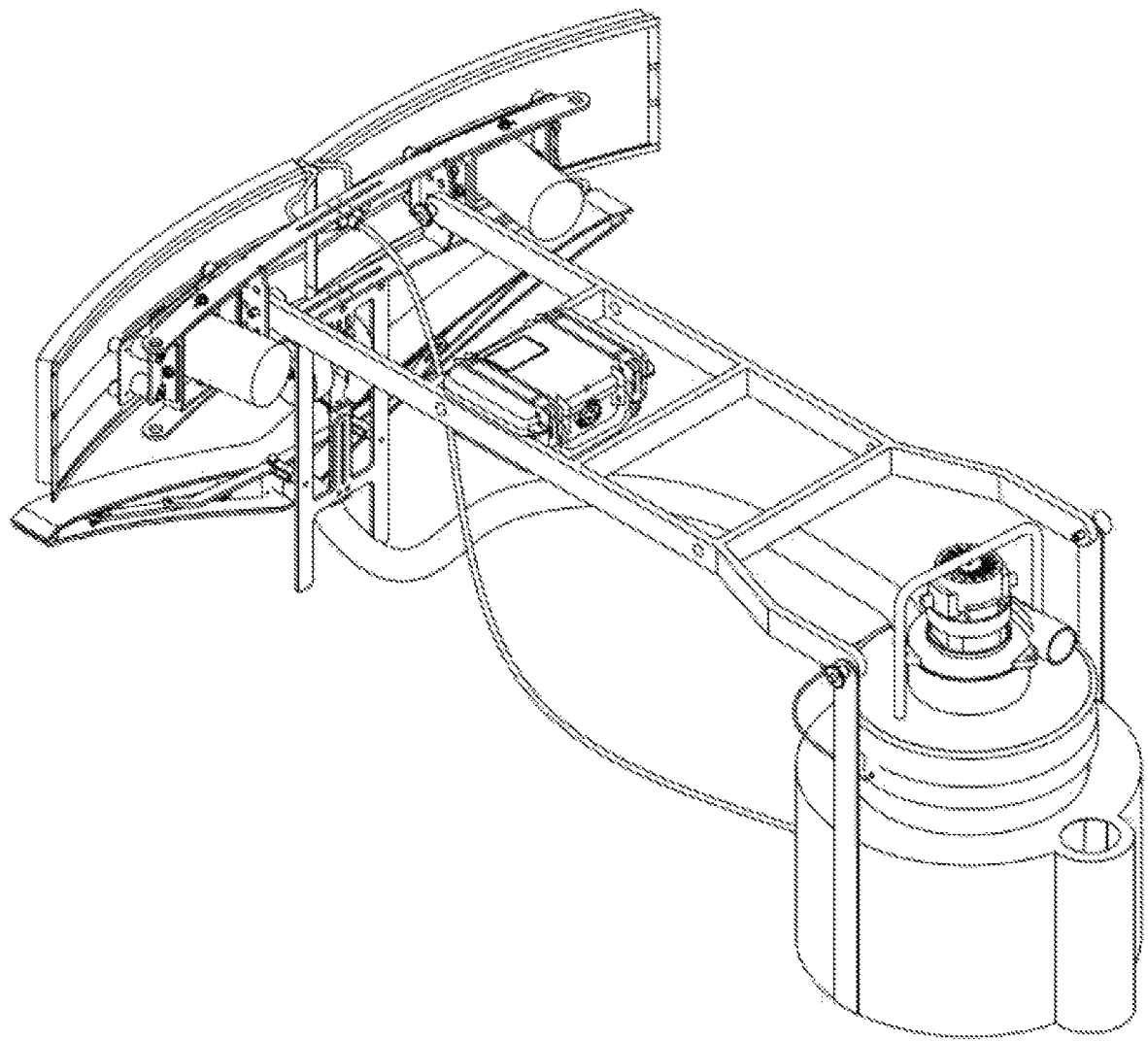
FIG. 4 is a top, perspective view of the system; the view showing a scrub head assembly; the view showing a collector assembly; the view showing a switchable magnetic wheel, the view showing an applicator; the view showing a frame; the view showing a frame supporting an onboard computing system; the view showing a frame supporting various components of the system; the view showing a vacuum hose assembly; the view showing a collection and storage tank.
Figure 5:
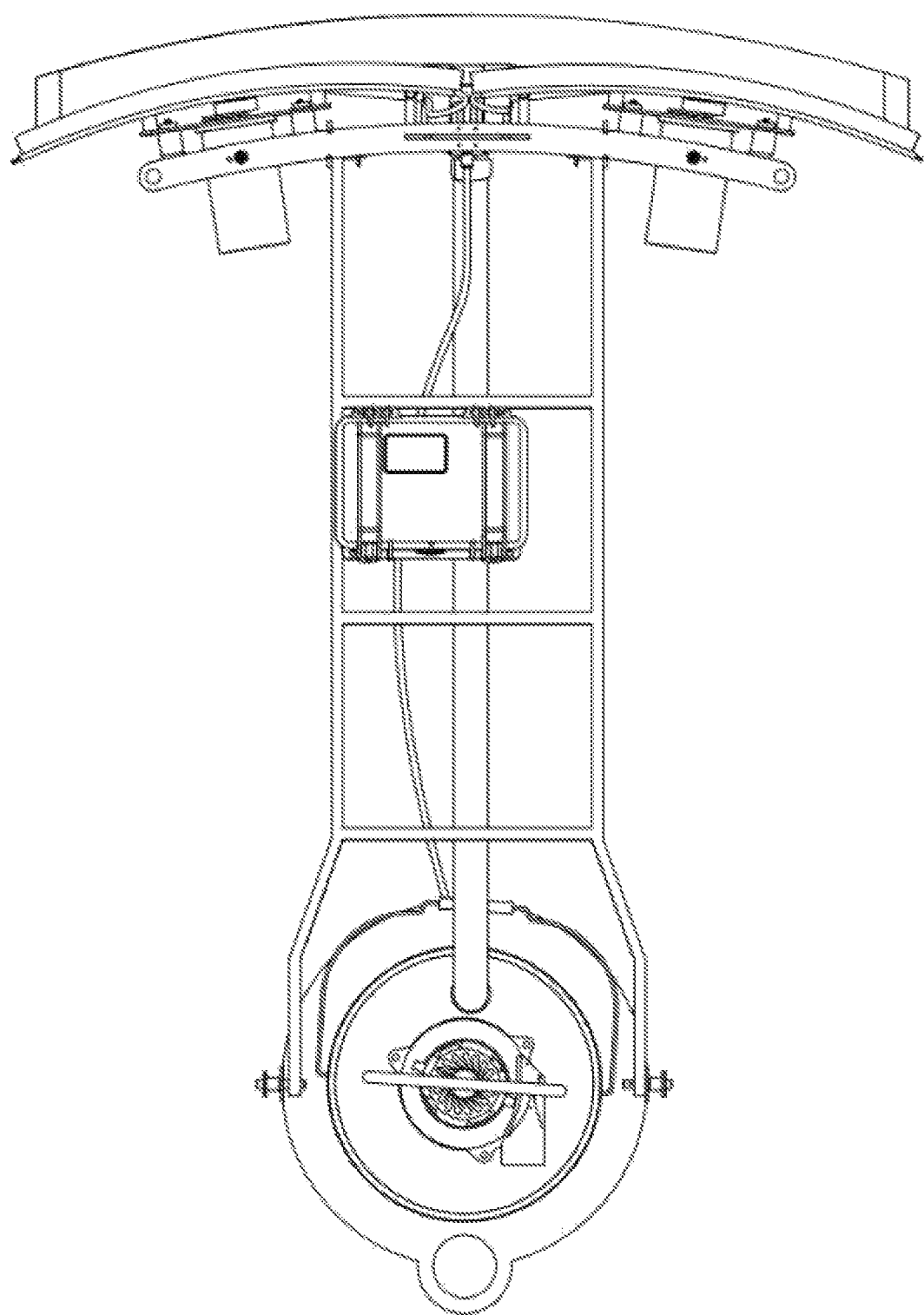
FIG. 5 is a top view of the system; the view showing a scrub head assembly; the view showing a collector assembly; the view showing a switchable magnetic wheel, the view showing an applicator; the view showing a frame; the view showing a frame supporting an onboard computing system; the view showing a frame supporting various components of the system; the view showing a vacuum hose assembly; the view showing a collection and storage tank.
Figure 6:
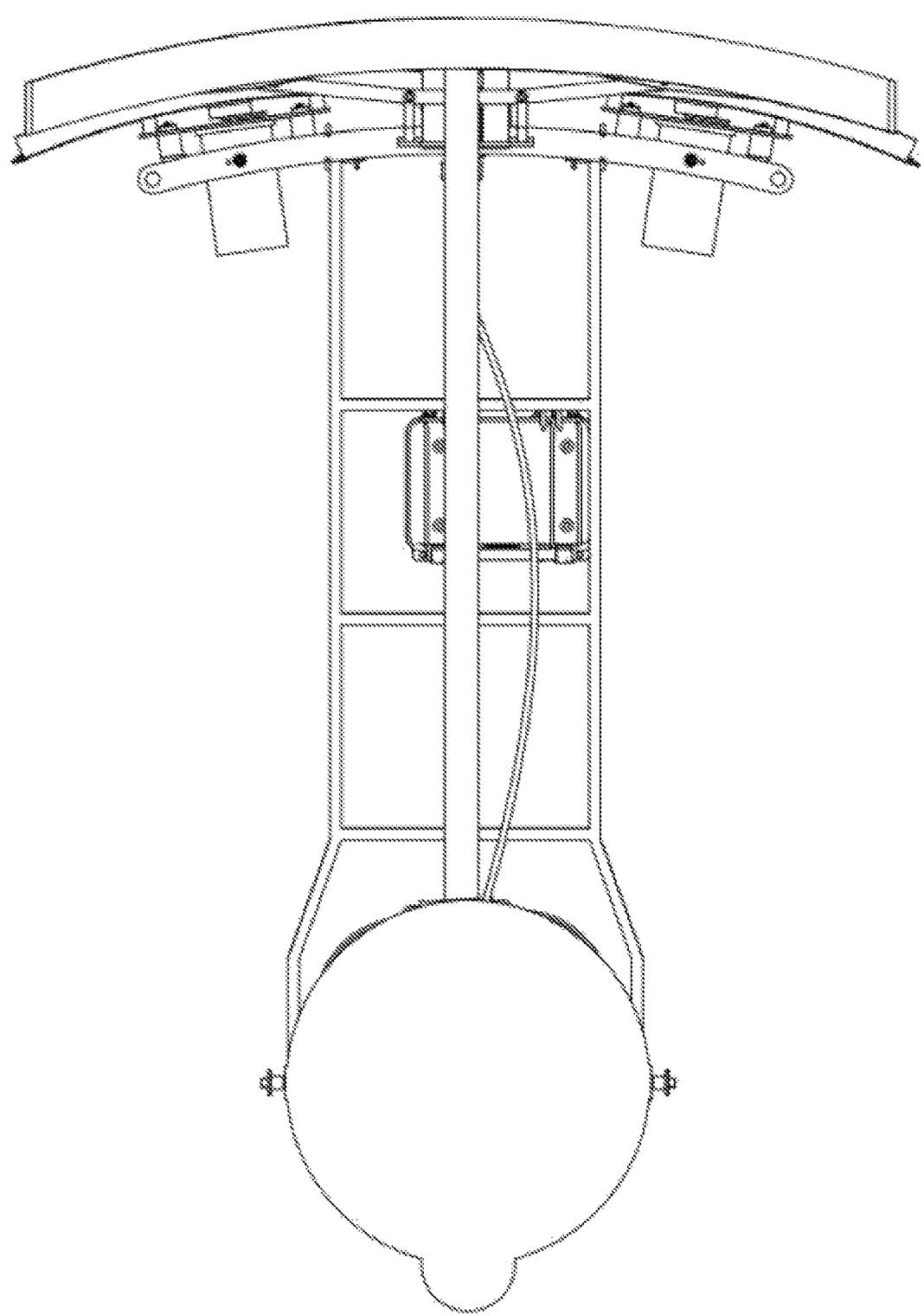
FIG. 6 is a bottom view of the system; the view showing a scrub head assembly; the view showing a collector assembly; the view showing a switchable magnetic wheel, the view showing an applicator; the view showing a frame; the view showing a frame supporting an onboard computing system; the view showing a frame supporting various components of the system; the view showing a vacuum hose assembly; the view showing a collection and storage tank.
Figure 7:
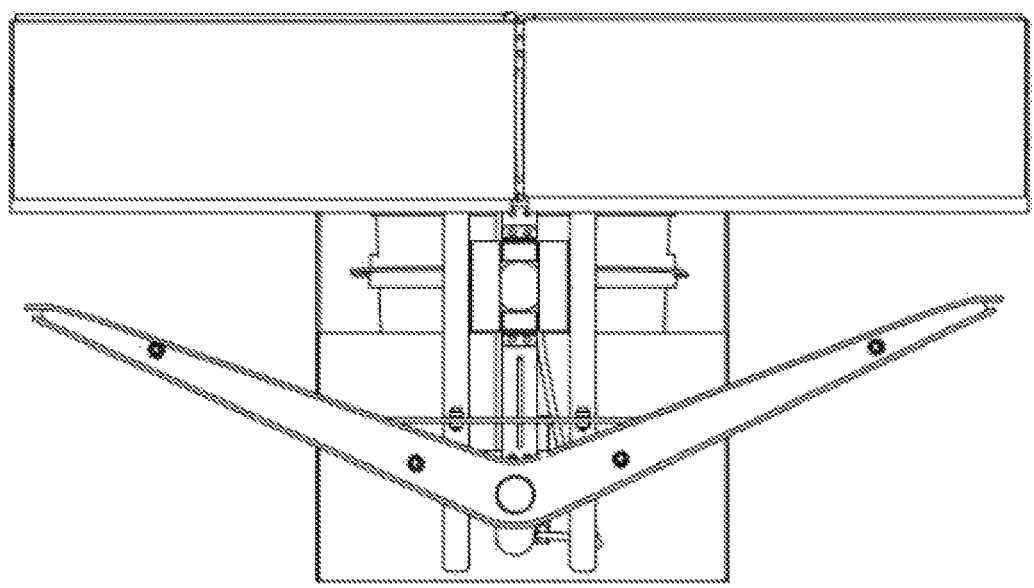
FIG. 7 is a front, elevation view of the system; the view showing a scrub head assembly; the view showing a switchable magnetic wheel; the view showing a collector assembly.
Figure 8:
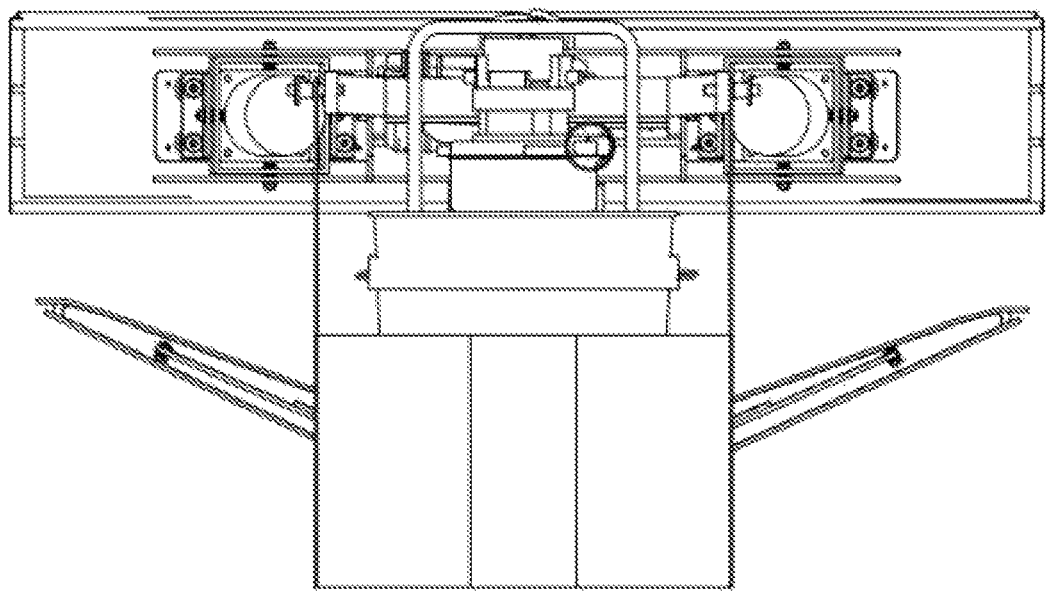
FIG. 8 is a rear, elevation view of the system; the view showing a scrub head assembly; the view showing a collector assembly; the view showing a motor; the view showing a scrub plate motor; the view showing a collection and storage tank.
Figure 9:
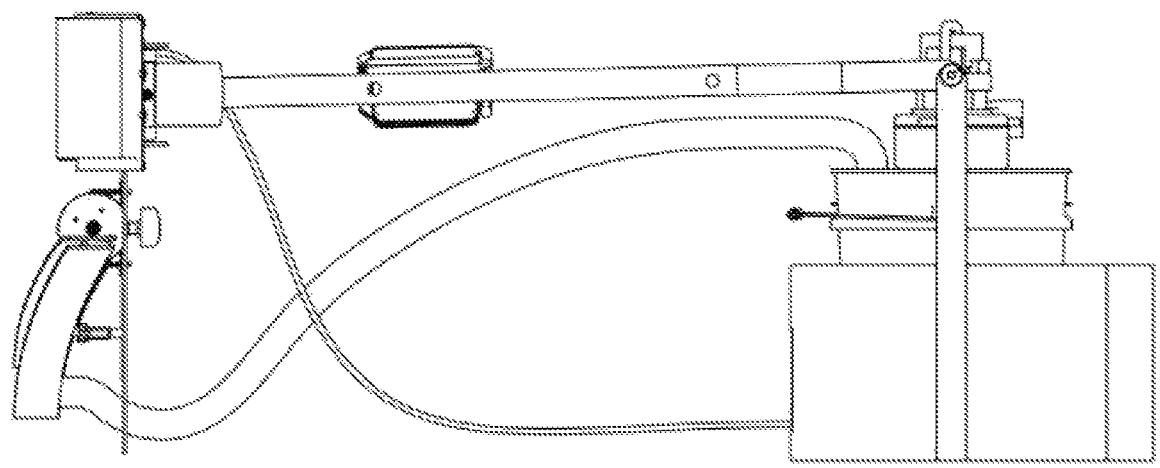
FIG. 9 is a side, elevation view of the system; the view showing a scrub head assembly; the view showing a collector assembly; the view showing a switchable magnetic wheel; the view showing an applicator; the view showing a frame; the view showing a frame supporting an onboard computing system; the view showing a frame supporting various components of the system; the view showing a vacuum hose assembly; the view showing a collection and storage tank.
Figure 10:
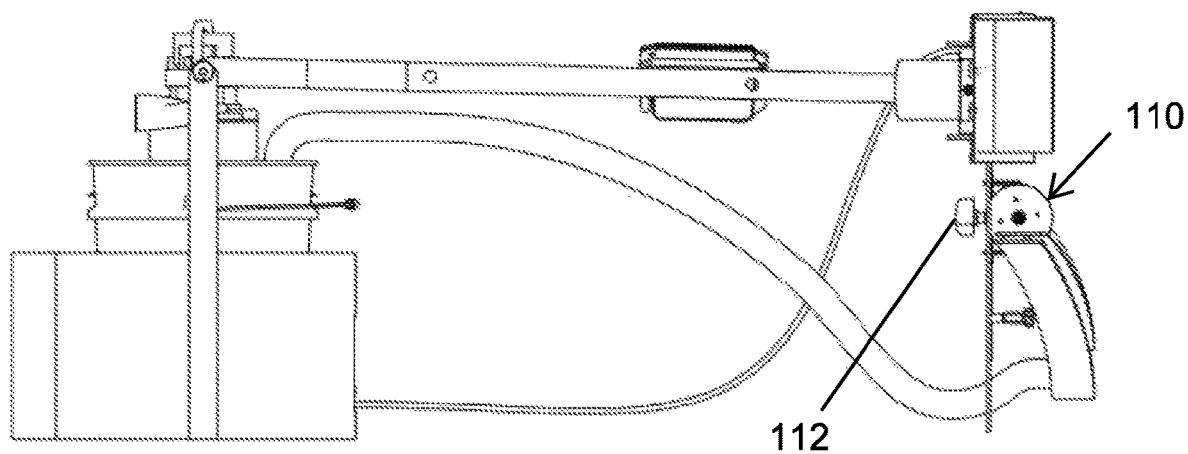
FIG. 10 is a side, elevation view of the system; the view showing a scrub head assembly; the view showing a collector assembly; the view showing a switchable magnetic wheel; the view showing an applicator; the view showing a frame; the view showing a frame supporting an onboard computing system; the view showing a frame supporting various components of the system; the view showing a vacuum hose assembly; the view showing a collection and storage tank.
Figure 11:
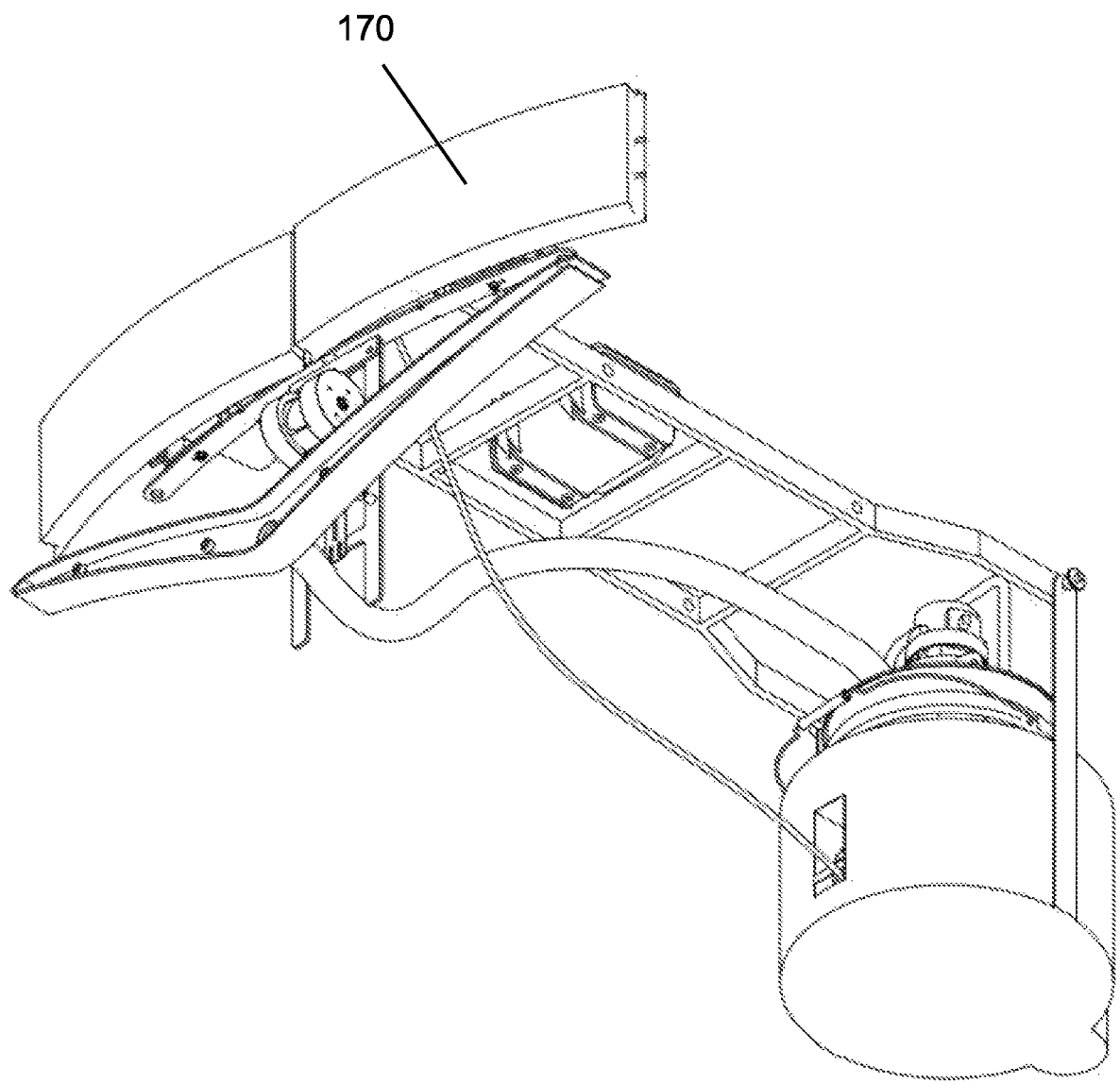
FIG. 11 is a bottom, perspective view of the system; the view showing a scrub head assembly; the view showing a collector assembly; the view showing a switchable magnetic wheel; the view showing an applicator; the view showing a frame; the view showing a frame supporting an onboard computing system; the view showing a frame supporting various components of the system; the view showing a vacuum hose assembly; the view showing a collection and storage tank.
Figure 12:
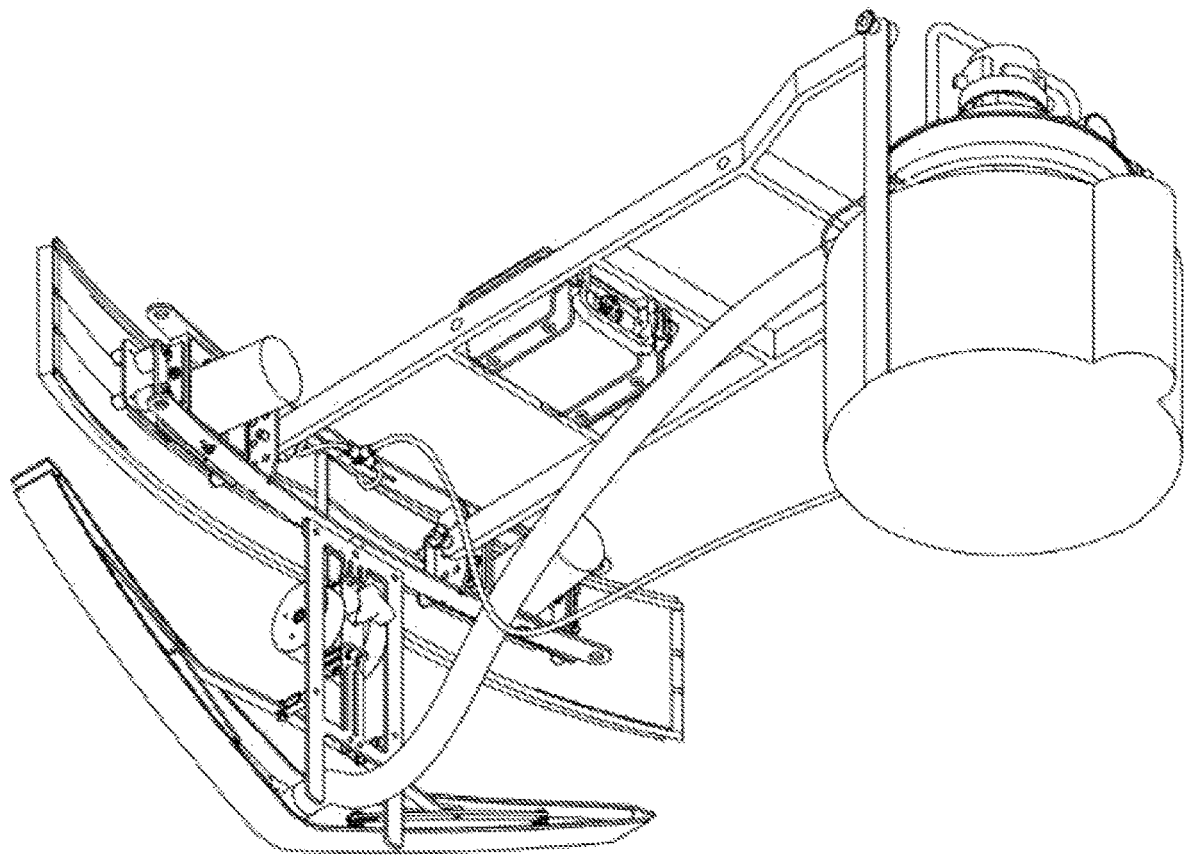
FIG. 12 is a bottom, perspective view of the system; the view showing a scrub head assembly; the view showing a collector assembly; the view showing a switchable magnetic wheel; the view showing an applicator; the view showing a frame; the view showing a frame supporting an onboard computing system; the view showing a frame supporting various components of the system; the view showing a vacuum hose assembly; the view showing a collection and storage tank.
Figure 13:
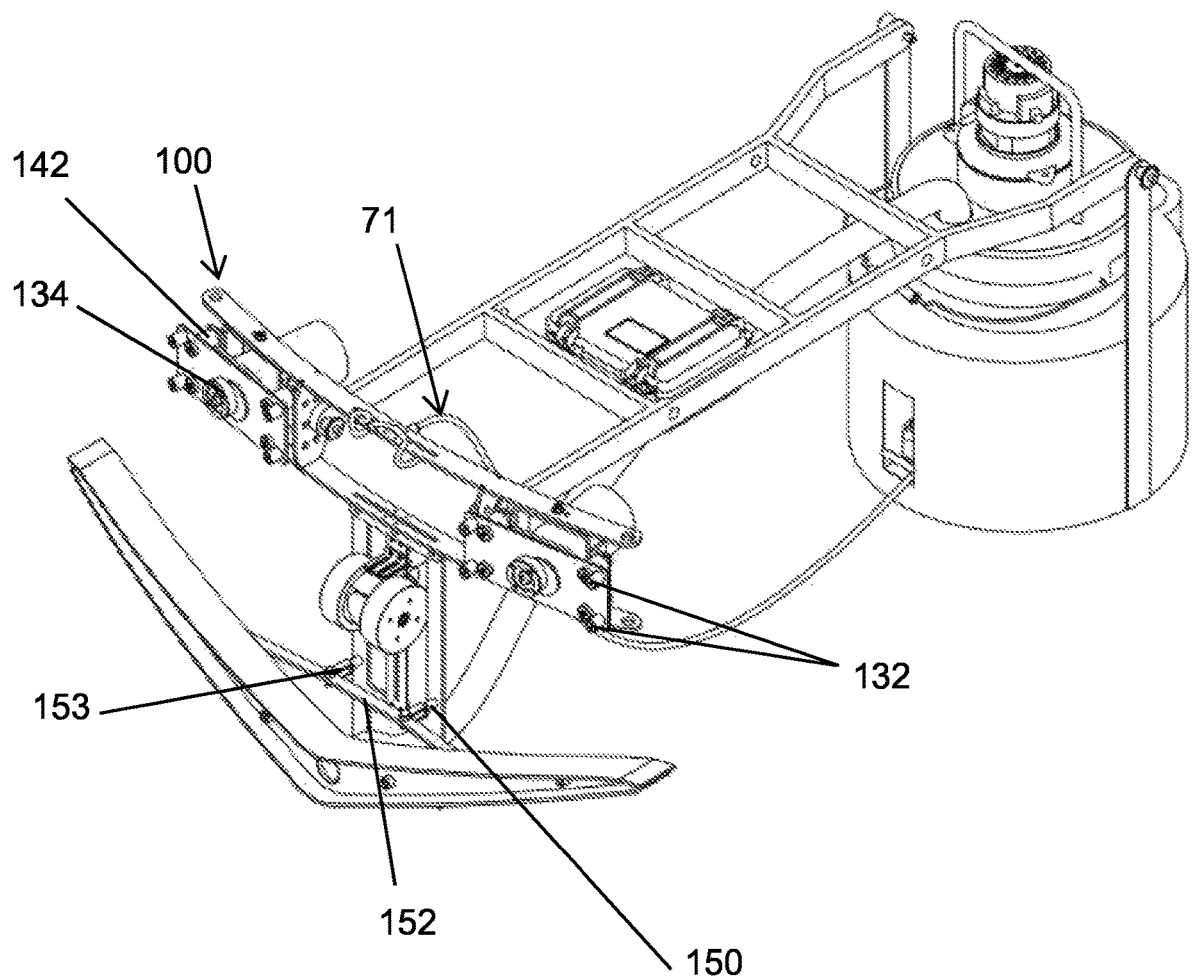
FIG. 13 is a top, perspective view of the system; the view showing a scrub head assembly; the view showing a collector assembly; the view showing a switchable magnetic wheel; the view showing an applicator; the view showing a frame; the view showing a frame supporting an onboard computing system; the view showing a frame supporting various components of the system; the view showing a vacuum hose assembly; the view showing a collection and storage tank.
Figure 14:
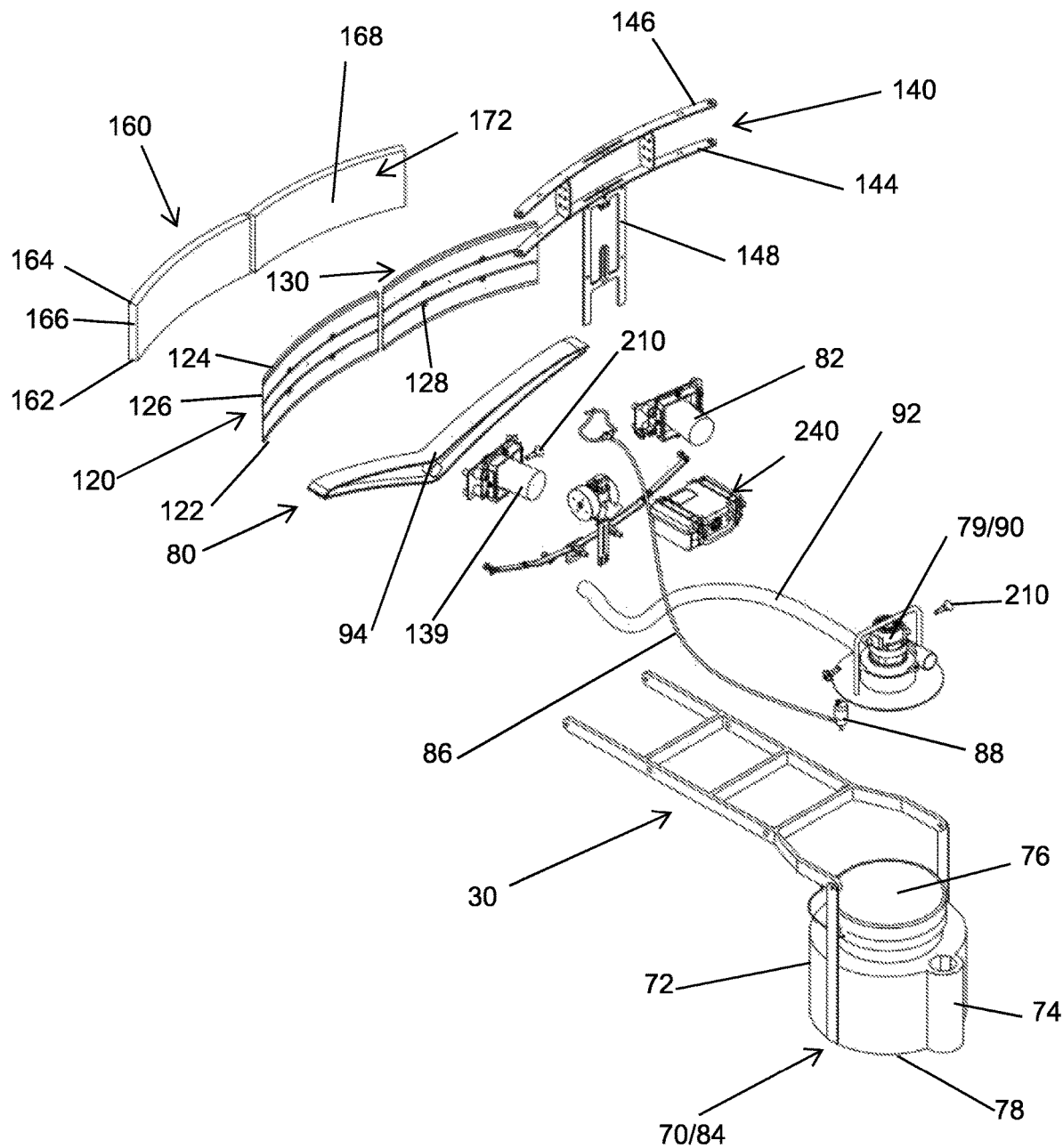
FIG. 14 is an exploded, isometric view of the system; the view showing a scrub head assembly; the view showing a collector assembly; the view showing a switchable magnetic wheel; the view showing an applicator; the view showing a frame; the view showing a frame supporting an onboard computing system; the view showing a frame supporting various components of the system; the view showing a vacuum hose assembly; the view showing a collection and storage tank.
Figure 15:
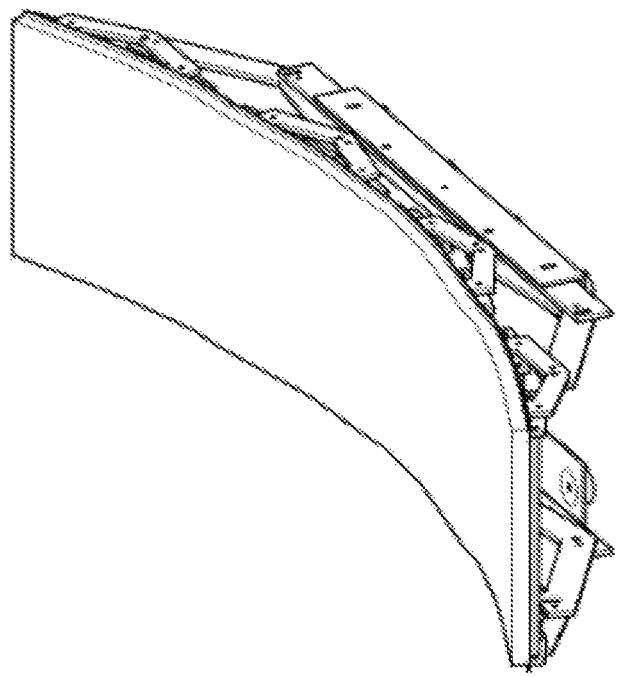
FIG. 15 is a top, perspective view of an alternative embodiment for a scrub plate, scrub pad, and scrub head assembly, and scrub plate frame system.
Figure 16:
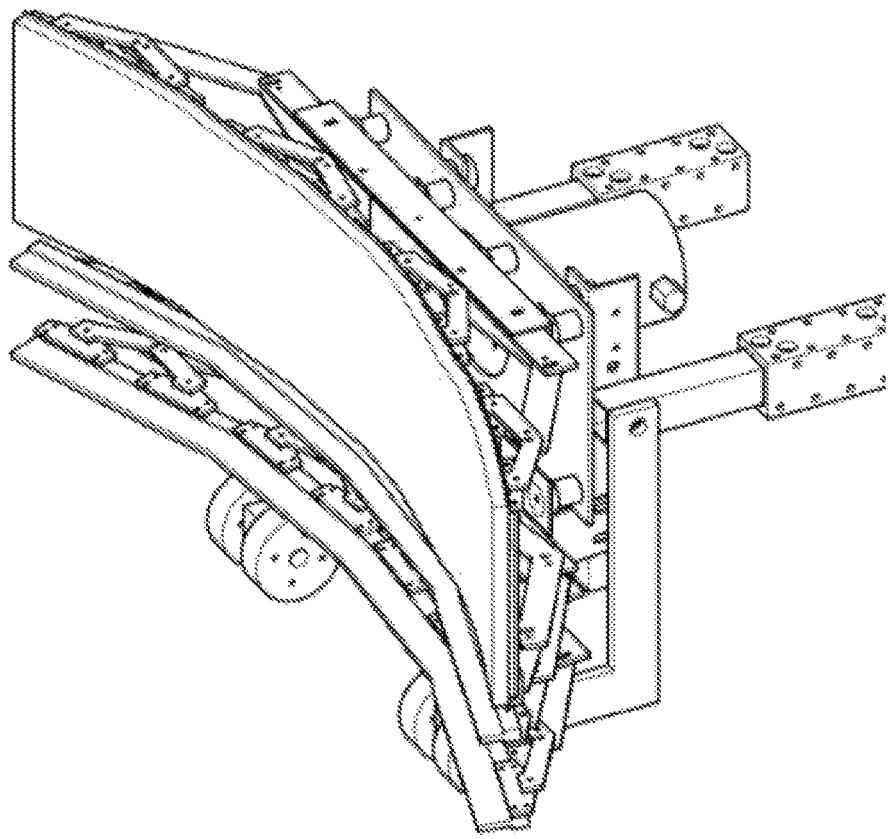
FIG. 16 is a top, perspective view of an alternative embodiment for a scrub plate, scrub pad, and scrub head assembly, and scrub plate frame system; the view also showing an alternative embodiment for a wheel assembly; the view also showing an alternative embodiment for a diverter and/or wiper system; the view also showing an alternative embodiment for a scrub plate motor assembly; the view showing an alternative embodiment for a frame system.
Figure 17:
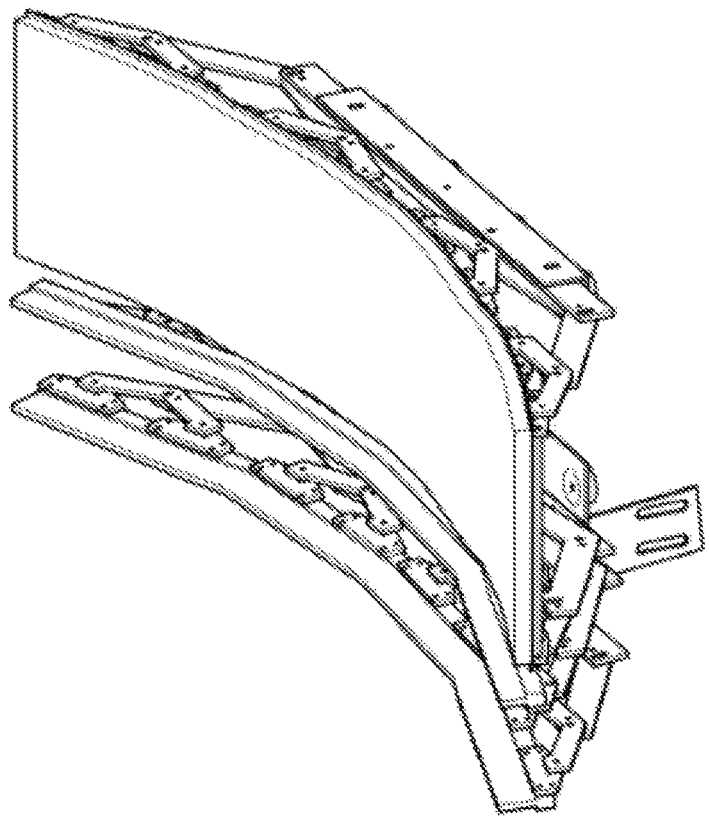
FIG. 17 is a top, perspective view of an alternative embodiment for a scrub plate, scrub pad, and scrub head assembly, and scrub plate frame system; the view also showing an alternative embodiment for a wheel assembly; the view also showing an alternative embodiment for a diverter and/or wiper system; the view also showing an alternative embodiment for a scrub plate motor assembly; the view showing an alternative embodiment for a frame system.
Figure 18:
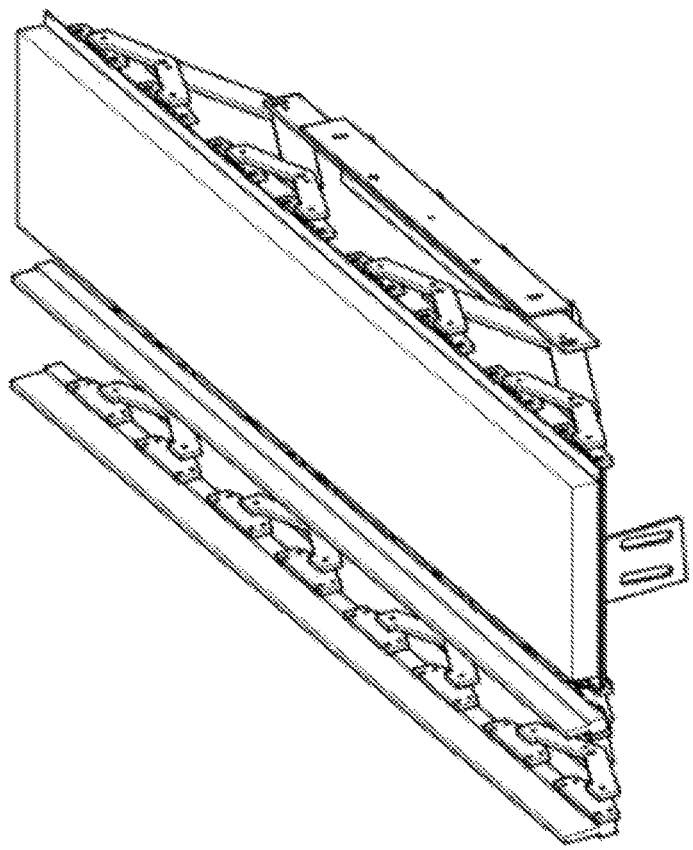
FIG. 18 is a top, perspective view of an alternative embodiment for a scrub plate, scrub pad, and scrub head assembly, and scrub plate frame system; the view also showing an alternative embodiment for a wheel assembly; the view also showing an alternative embodiment for a diverter and/or wiper system; the view also showing an alternative embodiment for a scrub plate motor assembly; the view showing an alternative embodiment for a frame system.

Frame:

In the arrangement shown, as one example and with reference to FIGS. 4 through 6 specifically, system 10 includes a frame 30. Frame 30 is formed of any suitable size, shape, and design and is configured to support various features of system. In the arrangement shown as one example, frame 30 extends from a first end nearer the collection tank to a second end nearer the scrub head assembly.

In this way, frame 30 includes vertically oriented features extending from the collection tank assembly. Arranged perpendicular to the vertically oriented support features are horizontally arranged support features and/or structure features which support the other features of system 10 and also provide for supporting the remaining features of system 10.

Alternative Embodiment Main Body:

In an alternative embodiment, another frame system is utilized, in this alternative embodiment, cleaning vehicle 19 includes a main body 30. Main body 30 (also referred to as "frame" or "chassis") is formed of any suitable size, shape, and design and is configured to house and hold the various components of the cleaning vehicle 19 of system 10. Said another way, frame 30 serves as the main structure of the cleaning vehicle 19 upon which other components and features are attached and/or secured. In this way, frame 30 provides support and stability and creates an overall frame for which cleaning vehicle 19 can be assembled and operated from.

In the arrangement shown, as one example, main body 30 includes a base which extends a length from a first end to a second end. The base extends this length between a front side and a rear side. In the arrangement shown, as one example, the base is generally flat and has a top surface and a bottom surface. In one alternative embodiment, as one example, a lip extends vertically around the perimeter to create an edge which aids in stabilization of features mounted to and/or secured to the base. Additionally, base may also include a plurality of attachment features for securing various components and features to the base.

In the arrangement shown, as one example, base is generally flat and rectangular in shape. However, other shapes are hereby contemplated for use for a base. Other shapes include, but are not limited to circular shapes, oval shapes, ellipses, square shapes, and the like. In the arrangement shown, as one example, cleaning vehicle 19 includes a single base. However, any other number of bases are hereby contemplated for use including but not limited to zero bases, one base, two bases, three bases, four bases, five bases, six bases, seven bases, or more bases as may be desired for holding components, providing support and structural features and the like.

In the arrangement shown, as one example, base is formed of a stainless steel. Stainless steel provides many benefits. However, other materials are also contemplated for use for a base. Other materials include, but are not limited to, polymers, enhanced polymers, carbon fiber, polyvinyl chloride, alloys, metal alloys, titanium, a combination thereof, and the like, and other materials suitable for this purpose.

In the arrangement shown, as one example, main body 30 includes an upper portion (or "upper support") which extends a length from a first end to a second end. The upper support extends this length between a front side and a rear side. In the arrangement shown, as one example, the upper support is generally formed of a rectangular support of L-brackets having a top and a bottom. In the arrangement shown, as one example, a lip may extend around the perimeter to create an edge which aids in stabilization of features mounted to and/or secured to the upper portion. Additionally, upper portion may also include a plurality of apertures, a plurality of attachment features for securing various components and features to the upper portion, and a plurality of connections which aid in securing the upper portion to the lintels which connect the upper portion to the base and provide support. These components combined create generally, and as one example, a main body 30 or frame for cleaning system 19.

In the arrangement shown, as one example, upper portion is generally flat and rectangular in shape. However, other shapes are hereby contemplated for use for an upper portion. Other shapes include, but are not limited to circular shapes, oval shapes, ellipses, square shapes, and the like. In the arrangement shown, as one example, cleaning vehicle 19 includes a single upper portion. However, any other number of bases are hereby contemplated for use including but not limited to zero upper supports, one upper support, two upper supports, three upper supports, four upper supports, five upper supports, six upper supports, seven upper supports, or more bases as may be desired for holding components, providing support and structural features and the like.

In the arrangement shown, as one example, upper support is formed of a stainless steel. Stainless steel provides many benefits. However, other materials are also contemplated for use for an upper support. Other materials include, but are not limited to, polymers, enhanced polymers, carbon fiber, polyvinyl chloride, alloys, metal alloys, titanium, a combination thereof, and the like, and other materials suitable for this purpose.

In the arrangement shown, as one example, main body 30 includes a plurality of lintels (or "plurality of supports") which extend a length from a first end at the base or beyond to a second end at the upper portion or beyond. In the arrangement shown, as one example, each of the plurality of supports are generally formed of an L-bracket. However, other supporting structures are also hereby contemplated for use. Plurality of supports may be formed of a simple rod, a c-channel, a hollow channel, or other form.

Additionally, and in the arrangement shown, as one example, plurality of supports include a plurality of attachments features—which secure the supports to the base and the upper portion. These components combined create generally, and as one example, a main body 30 or frame for cleaning system 19.

In the arrangement shown, as one example, cleaning vehicle 19 includes four supports. However, any other number of supports are hereby contemplated for use including but not limited to zero supports, one support, two supports, three supports, five supports, six supports, seven supports, or more supports as may be desired for holding components, providing support and structural features and the like.

In the arrangement shown, as one example, the plurality of supports are formed of stainless steel. Stainless steel provides many benefits. However, other materials are also contemplated for use for an upper support. Other materials include, but are not limited to, polymers, enhanced polymers, carbon fiber, polyvinyl chloride, alloys, metal alloys, steel, titanium, a combination thereof, and the like, and other materials suitable for this purpose.

Bidirectionality of Frame Elements: In the arrangement shown, as one example, the structure includes bidirectional frame elements. Bidirectional frame elements are formed of any suitable size, shape, and design and are configured as generally flat patterns of stainless steel which connect the vacuum rail (to be further described herein), the mad wheel (to be further described herein), and the scrub motor (to be further described herein). In the arrangement shown, as one example, the frame elements connect these various features to a common connection point and/or to a primary connection point.

Power Supply:

In the arrangement shown, as one example, cleaning vehicle 19 includes a power supply. Power supply is formed of any suitable size, shape, and design and is configured to provide energy to the system 10. Power supply, in the arrangement shown, may not move such as other mechanical components of the system may "move". Power supply is configured as a source of energy for the cleaning vehicle 19 of system 10.

In the arrangement shown, as one example, power supply is formed of a plurality of rechargeable batteries. The rechargeable batteries, or storage batteries, are an electrical battery designed to be charged, discharged, and recharged as many times as needed, as opposed to a disposable or primary batter, which is disposed of after use. However, a primary battery or disposable battery is also hereby contemplated for use. The rechargeable battery, in the arrangement shown, is formed of one or more electrochemical cells.

In the arrangement shown, as one example, power supply is formed of a rechargeable battery. However, the power supply may also consist of a plurality of rechargeable batteries and/or a plurality of batteries. In the arrangement shown, as one example, the power supply may also be formed of other power types and/or generators including, but not limited to solar power supply, natural gas or petrochemical power supply or fuel power supply in which an engine converts coal, gas, or other elements and/or sources into mechanical energy, as well as other power supply types.

Furthermore, in the arrangement shown, power supply may also include all necessary components, whether wires, conductors, cases, holders, and the like which provide for necessary connections and stabilization for power supply components.

Reservoir:

In the arrangement shown, as one example, cleaning vehicle 19 includes a plurality of reservoirs 70. Plurality of reservoirs 70 (also referred to as "washer fluid tank", or simply "wash tank", or simply "tank") are formed of any suitable size, shape, and design and is configured to accept, store, and dispense a solution and/or fluid. In the arrangement shown, as one example, a reservoir 70 includes a first end 72, a second end 74, a top 76, a bottom 78, an interior surface, an exterior surface, and at least one dispelling aperture and/or opening, and may also include a wash tank pump for moving and or pumping fluids from the tank, among other components and features.

In the arrangement shown, as one example, a single reservoir 70 is configured in the hollow interior of the main body 30. In this way, the reservoir 70 is accessible from the outside through the front and/or via refilling through an aperture within the shroud. In this way, the tank can be refilled without removing the shroud and can be quickly and easily put back into operation. Similarly, in an alternative embodiment an umbilical could be implemented which connects a regular supply of fluid to the tank. In yet another alternative embodiment, a tank may not be needed.

In the arrangement shown, as one example, a single reservoir 70 may be divided such that a single tank has a plurality of tanks within such that the center of gravity of cleaning vehicle 19 can be regulated. Said another way, even in events of large collections of fluid and movement of fluids throughout the system, the system 10 can move and/or determine which tanks will be filled in the reservoir 70 such that the system 10 remains stable as the solutions and/or contaminants are picked up in the recovery tank and/or reservoir 70. In another example, multiple reservoirs 70 might be used to achieve a similar outcome.

In the arrangement shown, as one example, system 10 includes two reservoirs 70. However, any other number of reservoirs 70 as might be suitable for a project is hereby contemplated for use. This includes, but is not limited to, zero reservoirs, one reservoir, three reservoirs, four reservoirs, and the like. Similarly, the reservoir could be remotely located and a reservoir could feed multiple cleaning vehicles 19.

Collection System:

In the arrangement shown, as one example, cleaning vehicle 19 includes a collection system 80. Collection system 80 is formed of any suitable size, shape, and design and is configured to collect dispensed fluid, contaminants, debris, and the like which has been used or removed from a surface. In this way, the used washer fluid, contaminants, and the like will not streak and/or run down a surface and/or remain on a surface for natural drying. Furthermore, in the arrangement shown, as one example, a low profile collection assembly is used. This is for current design purposes. However, other hose shapes and collection assembly configurations are hereby contemplated for use.

In the arrangement shown, as one example, the collection system tank is located as low as possible. In this way, the system reduces power consumption and changes how far and high which fluid being collected must travel. Furthermore, in the arrangement shown, as one example, the hose collection portion droops slightly to create and is configured so that the system does not drip or leak when shut off.

In the arrangement shown, as one example, collection system 80 includes a motor 82, a collection tank 84, a drain hose 86, a pump 88, a vacuum 90, a vacuum hose 92, and various collection diversion components 94, also referred to as a "diverter" 94 (to be further discussed herein. In this way, the system can divert contaminants and/or used washer fluid to a hose which can collect the fluid and cause the fluid to be stored in a collection tank for later disposal.

Vacuum Rail: In an alternative embodiment, and shown as one example, system 10 includes a vacuum rail. Vacuum rail is formed of any suitable size, shape, and design and is configured to provide a contaminant collection, contaminant movement, squeegee-like removal and deflection functionality. In the arrangement shown, as one example, vacuum rail, or vacuum squeegee, includes a squeegee plate which includes a series of tabs bent at an approximate perpendicular relation such that urethane squeegees and/or other squeegee material can be operably attached. This configuration is specifically designed and configured to provide the vacuum rail the ability to bend and contour to the surface of a structure as needed.

In this alternative embodiment, and as is shown in the figures as one example, the diverter 94 creates a low pressure area and/or flow area in which water and/or contaminants are caused to move across the entire width of the diverter 94. In another embodiment, the diverter 94 creates an area and/or gravity flow area in which water and/or contaminants are caused to move across a portion of the width of the diverter 94. In this way, the diverter 94, shown as one example, includes two mounted, curved, urethane squeegees. In the arrangement shown, the two mounted squeegees are mounted to a flexible plate which creates a continuous seal. The leading squeegee (or the "first squeegee") is perforated to allow flow through with the rear of the first squeegee being solid to prevent flow through.

Furthermore, in the arrangement shown, the diverter 94 is formed in a hyperbolic paraboloid form. This shape increases the functionality and causes intentional diversion and flow of water and/or contaminants to the entrance of the vacuum hose tube. In this way, the water and/or contaminants are diverted to the entrance of the vacuum hose tube and caused to be collected by the pump and collection container.

Furthermore, in the arrangement shown, as one example, the squeegee of the vacuum rail is supported by a load distribution frame. Load distribution frame is formed of any suitable size, shape, and design and is configured to support the vacuum rail plate and distribute the load evenly across the squeegees. Furthermore, the configuration also includes ball casters specifically positioned and designed to prevent over deflection of the squeegees. Furthermore, the ball casters, in the arrangement shown, are specifically located and configured within the vacuum area which reduces build complexity. This feature provides for further flexibility in the design and ability for movement among and across contours.

Squeegee Attachment Features: In yet another embodiment, the squeegee of the vacuum rail is removable. In this way, the squeegee is configured to be removed and is secured to the vacuum back plate and/or vacuum plate assembly by a plurality of attachment features. Attachment features of the urethane squeegee are formed of any suitable size, shape, and design and are configured to provide for replacement of the squeegee portion. In this way, the plurality of fastenings can provide for removal for transport, removal for repair, removal for replacement, and the like. In the arrangement shown, as one example, a number of small plastic fasteners are used along the length of the squeegee. These plastic fasteners are somewhat like rivet fasteners in construction but are removable and adjustable. While this rivet like fastener is contemplated for use, other attachment features for attaching the squeegee to the vacuum head assembly are hereby contemplated for use.

Head Assembly:

In the arrangement shown, as one example, cleaning vehicle 19 includes a head assembly 100. Head assembly 100 is formed of any suitable size, shape, and design and is configured as the primary interaction assembly which causes a surface to be engaged, cleaned, and the like. In this way, and in the arrangement shown, the head assembly includes various components and systems from the scrubbing system to the diverter and/or wiper system and the support and motor system which engage and/or disengage these systems and cause operations and/or various functionality of these systems. (various components of head assembly 100 to be further described herein).

In the arrangement shown, as one example, head assembly includes a plurality of head motors. The plurality of head motors, in the example shown, is configured to provide for a wide cleaning path while being able to maintain even pressure on a surface. In one arrangement, as is shown, the head motor assembly is on a gimbal which is configured to adapt to various surface shapes, surface imperfections, and wind loading, and other circumstances, such as may cause equipment to move during operation.

Motor Assembly Alternative Embodiment:

In the arrangement shown, as one example, an alternative motor assembly embodiment is disclosed. Motor assembly is formed of any suitable size, shape and design and is configured with two motor assemblies. In the arrangement shown, as one example, the two motor assemblies are identical and/or similar in construction.

In the arrangement shown, as one example, the motor assembly includes a titanium scrub plate that mounts to the assembly. Additionally, and in the arrangement shown, as one example, the motor assembly includes a motor mount plate, an eccentric, a motor, a plurality of vibration isolators (both forward and rear facing in the embodiment shown, as one example, a gimbal ring, a plurality of angle brackets, and various associated fastenings.

Scrub Plate:

In the arrangement shown, as one example, the head assembly 100 of the cleaning vehicle 19 includes a scrub plate 120. Scrub plate 120 is formed of any suitable size, shape, and design and is configured to act as the mounting system and functionality system for the scrub pads 160 (to be further described herein). Said another way, the scrub plate 120 includes various components that aid in operation of the scrub pad in the cleaning of a surface. This includes, but is not limited to causing the scrub pad to engage and/or disengage a surface, cause the scrub pad to vibrate and/or move in a way which scrub pad scrubs a surface (with varying intensity, depending on that desired by a user), and allow scrub pad to displace and or disengage in the event of an obstacle and/or bump and the like, as well as other movements, cleaning, and functionality.

In the arrangement shown, as one example, scrub plate 120 extends a length from a first end 122 to a second end 124 between opposing sides 126 which form the main structure of the scrub plate 120. In the arrangement shown, as one example, the scrub plate includes an interior surface 128 to which the scrub pad mounts and an exterior surface 130 on the cleaning vehicle side 130. In the arrangement shown, as one example, the scrub plate 120 also includes a plurality of isolator connection features 132 and scrub pad connection features 134. In the arrangement shown, as one example, the scrub plate 120 is operably connected to the scrub plate mount assembly 140.

In the arrangement shown, as one example, the scrub plates 120 are connected to motors which activate an eccentric drive. In this way, and said another way, the scrub plates 120 also are connected to outboard rubber isolators. These isolators are connected to the scrub plates at four corners. In this way, the plates are prevented from rotating or getting into an undesirable position. This assembly method also is configured to provide for small circle rotations of the scrub pads in small circles. In the arrangement shown, as one example, the scrub plates move in small circles and/or oscillate at 3,000 to 5,000 revolutions per minute (RPM). However, other oscillation rates are hereby contemplated for use such as 0 to 3,000 rpm, and 5,000 to 7,000 rpm, and 7,000 or more rpm. Furthermore, an additional set of isolators, as one example, isolates vibrations from the frame. In system 10, this is configured to keep vibrations where needed.

In the arrangement shown, as one example, the plurality of scrub plates 120 are formed of stainless steel. Stainless steel provides many benefits. However, other materials are also contemplated for use for scrub plates 120. Other materials include, but are not limited to, polymers, enhanced polymers, carbon fiber, polyvinyl chloride, alloys, metal alloys, steel, titanium, a combination thereof, and the like, and other materials suitable for this purpose.

Scrub Plate Dispensing System: In the arrangement shown, as one example, the scrub plate also includes a cleaning agent dispensing system. In the arrangement shown, as one example, the cleaning agent dispensing system is built into the upper leading edge of the scrub plate. Dispensing system, of the scrub plate, is formed of any suitable size, shape, and design and is configured to dispense a cleaning agent directly on the desired surface, and is included in the scrub plate system. In this way, the dispensing system applies the cleaning solutions and/or cleaning agent to the surface just prior to the scouring pads moving over the surface. Said another way, the dispensing system applies a cleaning agent just before the scouring pads and/or scrub plate travels over a surface with the vacuum rail trailing the scrub pad.

In the arrangement shown, as one example, the interior scrub plates are under contour and the external scrub plates are over contoured. Said another way, the contour difference ensures that the plate has good surface contact as the plate moves over a surface. Many surfaces vary in radius and/or contour and/or curvature. In the alternative embodiment, as is shown as one example, the varying contours of the scrub plate enable the cleaning of varying surface contours.

Furthermore, in the arrangement shown, as one example, the scrub pads are replaceable and the like. The system includes an attachment feature which allows for quick and easy replacement of the scrub pads. In one arrangement, the attachment feature is a hook and loop type of attachment which provides for quick and easy replacement. In another embodiment, the attachment feature is a frictional fitting. In another embodiment, the attachment feature is a hook and lock type of mechanism. Various attachment features are hereby contemplated for use including no attachment feature between the scrub plate and assembly.

Scrub Plate Mount Assembly:

In the arrangement shown, as one example, the head assembly 100 of the cleaning vehicle 19 includes a scrub plate mount system 140. Scrub plate mount system 140 is formed of any suitable size, shape, and design and is configured to act as the mounting system and functionality system for the scrub pads 160 (to be further described herein). Said another way, the scrub plate mount assembly 140 includes various components that aid in operation of the scrub pad in the cleaning of a surface. This includes, but is not limited to causing the scrub pad to engage and/or disengage a surface, cause the scrub pad to vibrate and/or move in a way which scrub pad scrubs a surface (with varying intensity, depending on that desired by a user), and allow scrub pad to displace and or disengage in the event of an obstacle and/or bump and the like, as well as other movements, cleaning, and functionality.

In the arrangement shown, as one example, scrub plate mount assembly 140 includes a plurality of isolators 142, a lower scrub plate bracket 144, an upper scrub plate bracket 146, a main bracket 148, a plurality of spacers 150, a plurality of shafts 152, and may also include a plurality of shaft extensions 153. Said another way, shaft extensions 153 include a linear bearing functionality that is configured to engage and/or disengage the cleaning head on a surface with a linear drive system and the like. These and other components as needed for a system for supporting, engaging and/or disengaging the scrub pad, and the like are hereby contemplated for use.

In the arrangement shown, as one example, the plurality of scrub plate mounting assemblies 140 are formed of a stainless steel. Stainless steel provides many benefits. However, other materials are also contemplated for use for a plurality of scrub plate mounting assemblies 140. Other materials include, but are not limited to, polymers, enhanced polymers, carbon fiber, polyvinyl chloride, alloys, metal alloys, steel, titanium, a combination thereof, and the like, and other materials suitable for this purpose.

Scrub Pad:

In the arrangement shown, as one example, the head assembly 100 of the cleaning vehicle 19 includes a scrub pad 160. Scrub plate 160 is formed of any suitable size, shape, and design and is configured as the primary engagement and cleaning mechanism of the surface and system 10. Said another way, and in the arrangement shown, as one example, the scrub pad 160 is the portion which comes into contact with the surface 14 and cleans the surface of contaminants. Similarly, depending on the application, the scrub pad may also move and/or scrub the surface clean and may utilize a cleaning agent.

In the arrangement shown, as one example, the scrub pad 160 extends a length from a first end 162 to a second end 164 between opposing sides. The scrub pad 160 includes an interior surface 168 which engages the surface 14 and an exterior surface 170 which engages the scrub pad mounting system 140. Additionally, the scrub pad 160 includes a plurality of mounting features 172.

In the arrangement shown, the scrub pad 160 is generally rectangular in shape and formed of a material which can hold and/or scrub a cleaning agent. Similarly, and in the arrangement shown, the scrub pads are concave on the interior surface of the scrub pad. However, other shapes such as flat or convex and the like are also contemplated for use. This application of various types of scrub pads will depend on the surface desired to be cleaned and whether the surface is an exterior surface or an interior surface may also have an impact on the scrub pad shape.

However, other shapes are hereby contemplated for use such as circular scrub pads, square scrub pads, oval scrub pads, and the like. Similarly, in the arrangement shown, as one example, two scrub pads are utilized. However, any other number of scrub pads 160 is hereby contemplated for use. In some arrangements, zero scrub pads (such as when only a sprayer and wipers are desired). Similarly, one scrub pad may be used, three scrub pads may be used, four scrub pads may be used, five scrub pads may be used, six scrub pads may be used, or more.

Diverter and/or Wiper Assembly:

In the arrangement shown, as one example, the head assembly 100 of the cleaning vehicle 19 includes a wiper assembly (or "diverter assembly"). Wiper assembly is formed of any suitable size, shape, and design and is configured to wipe and direct fluid and/or contaminants and/or debris from a surface. In this way, fluids and/or contaminants and/or debris can be collected and removed from a surface.

In the arrangement shown, as one example, system 10 includes a diverter or wiper system 180. The diverter 94 is formed of any suitable size, shape, and design and is configured to divert contaminants and used cleaning agents to a centralized or collected location to be collected by the vacuum system. In the arrangement shown, as one example, the diverter 94 is angled downward and inward to a location of collection and/or the entry of the vacuum hose. In the arrangement shown, as one example, the diverter 94 is formed of a material which can rub along the surface without damaging the surface, such as a rubber or urethane or the like.

Wiper Embodiment Alternative:

In an alternative embodiment, the wiper assembly includes but is not limited to a plurality of wipers, a plurality of wiper arms and a plurality of wiper mounts. In this way, various numbers of wipers can be deployed and the fluids and/or material can be directed and/or collected as desired. Similarly, the wiper arm assemblies are configured to displace in the event of obstacles and/or uneven surfaces. Similarly the wiper assembly can be engaged and/or disengaged with a surface 14.

Plurality of Attachments:

In the arrangement shown, as one example, system 10 and cleaning vehicle may include a plurality of attachments 210/212. System 10 may include a plurality of attachments 210 which secure the cleaning vehicle 19 to the structure 14 and/or surface 17. Plurality of attachments 210 may include ropes and the like.

Cleaning vehicle 19 may also include a plurality of attachments 212. These plurality of attachments 212 are formed of any suitable size, shape, and design and are configured to assemble and hold cleaning vehicle 19 together as well as secure components to the chassis 30 of cleaning vehicle 19. In this way, plurality of attachments 212 may include nuts, bolts, rivets, welds, screws, fasteners, hook and loop, ropes, ties, a combination thereof, and the like, and other attachment type features or components.

Plurality of Connections:

In the arrangement shown, as one example, system 10 may include a plurality of wire connections. Wire connections are formed of any suitable size, shape, and design and are configured to provide various operable connections of the system 10 including but not limited to electrical, mechanical, and fluid connections.

In the arrangement shown as one example, the system 10 includes various pivot points and/or pivot connections for flexibility within the system. Similarly, the scrubbers, squeegees, and vacuum recovery inlet are all mounted, in the arrangement shown as one example, to a common frame element. In this way, the entire element is configured to connect to the linear rail system at a pivot point and/or pivot connection.

Transport System:

In the arrangement shown, as one example, system 10 includes a plurality of transport features. Transport features are formed of any suitable size, shape, and design and are configured to stabilize the equipment and/or hold the equipment to the surface. Furthermore, in this arrangement, the transport system works in conjunction with the linear rail system providing for flying and/or transport of the system safely and/or removing the scrub assembly from the surface. Said another way, the present disclosure includes magnetic wheels 100 which provide for attachment to various surface types. In another arrangement, system 10 includes tracks for the transport system. In another arrangement, system 10 includes tracks and/or wheels with suction cups and/or other features that aid in securing the cleaning vehicle 19 to the surface.

Switchable Magnetic Wheel: In the arrangement shown, and as an alternative embodiment, the transport system includes a switchable magnetic wheel 100. Switchable magnetic wheel 100 is formed of any suitable size, shape, and design and is configured to move system 10 and securely attach the system 10 a structure without causing any damage to the structure while providing minimal friction against the structure and minimal friction for efficiency of operation of the transport system.

In the arrangement shown, as one example, switchable magnetic wheels have a curved edge and an adjustment feature 112. In this way, the wheels are smooth and will not cause damage. In the arrangement shown, as one example, the wheels are configured with a 0.25" radius which prevents the wheel edges from marking and/or damaging the surface of the structure which is being cleaned by the system.

Furthermore, and in the arrangement shown, as one example, the magnetic wheels provide for and are configured to provide a consistent reaction force as system 10 is moving across the surface of a structure and/or moving around in operation. Furthermore, and in the arrangement shown, the magnetic wheel and/or magnetic wheels are switchable. Said another way, an operator and/or user can switch on and/or off the activation of the magnetic wheel. Similarly, the system may cause these wheels to activate and/or deactivate automatically and/or by a predetermined set of rules in the navigation, as is necessary for moving the system about.

In the arrangement shown, the magnetic wheels are mounted to a suspension spring. In this way, the system can more easily handle and navigate surface irregularities such as bumps and the like. In this way, the movement of the system on a surface has a better movement performance. Furthermore, the impulse loading on a magnet of the magnetic wheels reduces the ultimate force required for the proper activation of the system as the system is pulled by forces to a structure. Said another way, the suspension spring provides for the reduction of peak impulse load on the system and/or that the system is capable of.

Mount System of Wheel: In the arrangement shown, as one example, the magnetic, switchable, wheel also includes a mount system. Mount system is formed of any suitable size, shape, and design and is configured to operably connect the wheel to the cleaning vehicle. In this way, the wheel can be engaged and disengaged. In the engaged position, the wheel makes contact with the surface of the structure. In the disengaged position, the wheel can be removed from contact and/or disengaged magnetically (which might still be in contact) with the surface of a structure.

Furthermore, in the arrangement shown, as one example, the mounting system of the wheel is a leaf spring system, similar to the type of system which might be found on an automobile. In this way, the wheel can be deflected and/or act as a suspension type of system for the cleaning vehicle, in the event of obstacles and the like. Furthermore, this provides stability in cleaning and creates a more constant and/or constant engagement of the diverter and/or squeegee system against the surface during operation.

In the arrangement shown, as one example, the mounting system for the wheel is a leaf spring system. However, other mounting systems are also hereby contemplated for use. Some examples of alternative mounting systems include, but are not limited to, a fixed mounting system, a spring loaded mounting system, a hydraulic mounting system, other coil spring mounting systems, other piston mounting systems, linkages, torsion bars, and other components as may aid in mounting the wheel and/or wheels to the cleaning assembly.

Computing Platform:

In the arrangement shown, as one example, system 10 includes a computing platform (or "computer", or "computer platform"). Computing platform is formed of any suitable size, shape, and design and is configured to provide computing support, power, and computing processing for both onboard computing functionality as well as communication for off-board or server computing functionality. In this way, an onboard computing system 240, among other components and features on top of the platform.

In the arrangement shown, as one example, system 10 includes a computer. Computer is formed of any suitable size, shape, and design and is configured to provide for the main off-board computing processing and implementation of computer handling of data from data gathering performed within the environment. The data processing may include, but is not limited to, artificial intelligence of sorting and organizing images gathered which may include stitching and object recognition and/or layer and layer recognition of continuous scans of a surface and/or structure and/or operations of the cleaning vehicle 19 and other components of system 10.

Onboard Computing System:

In one arrangement, as is shown, system 10 includes an onboard computing system 240 (or "onboard computing device"). Onboarding computing system 240 is formed of any suitable size, shape, and design and configured to handle onboard computing operations, as are necessary for the operation of the cleaning vehicle 19 and/or system 10. Onboarding computing device 240 is connected with electronic network and/or database and/or server or cloud via communication means, bluetooth communication, bluetooth low energy chip (BLE onboard), and may include a processor, a memory, a microcontroller, a printed circuit board, a microprocessor, a receiver/transceiver, may include at least one antenna, and a global positioning system, among other components.

Computing device 240 may be formed of and/or include any computing device capable of displaying and manipulating data in the manners described herein. Computing device 240 may include for example a desktop computer, a laptop computer, a tablet, smart phone, or any other computing device or other interactive device.

Computing device 240 may be a single consolidated component, or alternatively, computing device 240 may be formed of a plurality of interconnected components that may be co-located or located at different geographic locations. Computing device 240 may be cloud based or it may be hardware based, or cloud capable. In addition, the connected components of computing device 240, including processor, memory, software and interactive user display, may be co-located with computing device 240 or located at different geographic locations, independent control features of scrubbing and/or scrubbing motors, cleaning solution application, vacuum and/or recovery systems, dispensing systems, and the like. That is, computing device 240 may be made of any form of a device or system that individually or collectively performs the computing operations of system 10.

Printed Circuit Board: In the arrangement shown, as one example, system 10 may include a printed circuit board ("PCB"). PCB is formed of any suitable size, shape and design and is configured to facilitate carrying and/or holding other components and/or parts necessary to carry out various computation and/or related functions of system 10. PCB, as one example, might be a surface mounted PCB or a through-hole PCB. PCB, as one example, is green and facilitates connecting the components and/or parts of system 10 by the use of traces and or vias. Traces are formed of any suitable size, shape and design and are configured as lines electrically connecting the components and/or parts of system 10. Vias are formed of any suitable size, shape and design and are configured as holes that connect layers of traces together.

Generally, as in shown, traces and vias are soldered to connect the components and/or parts to the PCB.

In an alternative embodiment, system 10 may not include an onboard computer device 240, but instead houses only a receiver and/or transceiver for sending and/or receiving information which is both sensed and/or information which is sensed and/or captured by the image capturing devices of system 10. In this way, system 10 may be connected to a mobile computing device via a cellular connection, a direct connection, or other connections which provide a means of receiving and/or sending communications.

Microprocessor: Microprocessor is any computing device that receives and processes information and outputs commands according to instructions stored in memory. Memory is any form of information storage such as flash memory, RAM memory, a hard drive, or any other form of memory. Memory may be included as a part of or operably connected to a microprocessor. A receiver/transceiver is connected to a microprocessor. A receiver is used if one way communication is utilized, whereas a transceiver is used if two-way communication is utilized (hereinafter "transceiver"). Receiver/transceiver is connected with an antenna, such as a monopole antenna, a loop antenna, a fractal antenna, or any other form of an antenna. Antenna receives wireless signals from any other device, transmits these signals to receiver/transceiver which processes these signals and then transmits these processed signals to microprocessor which processes these signals according to instructions stored in memory. In one arrangement, system 10 re-transmits operating commands signals through receiver/transceiver so as to similarly control over-the-air communication. Communication is any form of wireless signals, or wired signals, through the air, such as a conventional remote signal, a cell phone, a wireless device, an internet connected device, a hard-wired device, or any other device capable of transmitting remote control signals.

Memory: In the arrangement shown, as on example, system 10 includes a memory. Memory may be formed of any suitable size, shape and design and is configured to facilitate selective storage and retrieval of data (including data) in association with computing devices, processors, software and interactive user display. Memory may be a single component, such as a single chip or drive or other memory device, or alternatively memory may be formed of a plurality of memory or storage components that are connected to one another that may be co-located or located at different geographic locations.

Remote Computing System:

In one arrangement, as is shown, system 10 includes a remote computing system (or "remote computing device"). Remote computing device is formed of any suitable size, shape, and design and configured to handle onboard computing operations, as are necessary for the operation of the cleaning vehicle 19 and the operations of system 10. Remote computing device is connected with electronic network and/or database and/or server or cloud via communication means and includes a processor, a memory, a microcontroller, a printed circuit board, a microprocessor, a receiver/transceiver, may include at least one antenna, a power supply, and a communications system, among other components.

Computing devices may be formed of any computing device capable of displaying and manipulating data in the manners described herein. Computing devices may include for example a desktop computer, a laptop computer, a tablet, smart phone, or any other computing device or other interactive device.

Computing devices may be a single consolidated component, or alternatively, computing devices may be formed of a plurality of interconnected components that may be co-located or located at different geographic locations. Computing devices may be cloud based or it may be hardware based, or cloud capable. In addition, the connected components of computing devices, including processor, memory, software and interactive user display, may be co-located with computing devices or located at different geographic locations. That is, computing devices may be made of any form of a device or system that individually or collectively performs the computing operations of system 10.

Printed Circuit Board: In the arrangement shown, as one example, system 10 includes a printed circuit board ("PCB"). PCB is formed of any suitable size, shape and design and is configured to facilitate carrying and/or holding other components and/or parts necessary to carry out various computation and/or related functions of system 10. PCB, as one example, might be a surface mounted PCB or a through-hole PCB. PCB, as one example, is green and facilitates connecting the components and/or parts of system 10 by the use of traces and or vias. Traces are formed of any suitable size, shape and design and are configured as lines electrically connecting the components and/or parts of system 10. Vias are formed of any suitable size, shape and design and are configured as holes that connect layers of traces together. Generally, as in shown, traces and vias are soldered to connect the components and/or parts to the PCB.

In an alternative embodiment, system 10 may not include an onboard computer device, but instead houses only a receiver and/or transceiver for sending and/or receiving information which is both sensed and/or information which is sensed and/or captured by the image capturing devices of system 10. In this way, system 10 may be connected to a mobile computing device via a cellular connection, a direction connection, or other connections which provide a means of receiving and/or sending communications.

Microprocessor: Microprocessor is any computing device that receives and processes information and outputs commands according to instructions stored in memory. Memory is any form of information storage such as flash memory, RAM memory, a hard drive, or any other form of memory. Memory may be included as a part of or operably connected to a microprocessor. A receiver/transceiver is connected to a microprocessor. A receiver is used if one way communication is utilized, whereas a transceiver is used if two-way communication is utilized (hereinafter "transceiver"). Receiver/transceiver is connected with an antenna, such as a monopole antenna, a loop antenna, a fractal antenna, or any other form of an antenna. Antenna receives wireless signals from any other device, transmits these signals to receiver/transceiver which processes these signals and then transmits these processed signals to microprocessor which processes these signals according to instructions stored in memory. In one arrangement, system 10 re-transmits operating commands signals through receiver/transceiver so as to similarly control over-the-air communication. Communication is any form of wireless signals, or wired signals, through the air, such as a conventional remote signal, a cell phone, a wireless device, an internet connected device, a hard-wired device, or any other device capable of transmitting remote control signals.

Memory: In the arrangement shown, as one example, system 10 includes a memory. Memory may be formed of any suitable size, shape and design and is configured to facilitate selective storage and retrieval of data (including data) in association with computing devices, processors, software and interactive user display. Memory may be a single component, such as a single chip or drive or other memory device, or alternatively memory may be formed of a plurality of memory or storage components that are connected to one another that may be co-located or located at different geographic locations.

Sensor System:

In the arrangement shown, as one example, system 10 includes a sensor system. Sensor system is formed of any suitable size, shape, and design and may include one or more sensors and/or one or more sensing technologies. In the arrangement shown, as one example, sensor system is configured to detect and communicate information related to system 10 as well as the surroundings and/or environment of system 10.

In the arrangement shown, as one example, various sensors are utilized within system 10 to detect system status such as low tanks, temperature changes, full tanks, and other operating status parameters within system 10.

In the arrangement shown, as one example, a sensory system and perhaps a LIDAR sensor system is utilized to understand the environment surrounding system 10 and/or the environment and/or surface system 10 is engaging with. This might include both distance and imaging sensors and/or camera sensors.

Other Sensors:

In addition to the distance and image sensors discussed herein, system 10 may also include other sensors, such as temperature sensors, moisture sensors, heat sensors, light sensors, motion sensors, and other sensors. In the arrangement shown, as one example, system 10 includes at least one other sensor. Other sensors are formed of any suitable size, shape and design and are configured to facilitate sensing of the surface and/or environment and converting the characteristics of the outside space and/or environment into computer readable information. Other sensors are used to detect and respond to some type of input from the physical environment.

Other sensors may be used for sensing a single component of a surface and/or environment, or alternatively another sensor may be used to sense a plurality of components of a surface and/or environment. For example, the specific input of other sensors may be light, heat, motion, moisture, pressure, or any one of a great number of other surface and/or environmental information. Another sensor is a device, module, or subsystem whose purpose is to detect events or changes in its environment and send the information to other electronics, frequently a computer processor. The output of another sensor is generally a signal that is generally converted to human-readable display at the sensor location or transmitted electronically over a network for reading or further processing. Both analog sensors and/or digital sensors are hereby contemplated for use. In one arrangement, another sensor and/or microsensor sends information to a processor for use with other electronics.

Control System:

In an alternative embodiment, and as shown in one example, an alternative control system is provided which is modular and configured to further provide for an easier storage, transport, set up, movement, and/or transport inside or outside the structure, between structures, and in storage facilities and the like. In this arrangement, as one example, a bluetooth low energy remote control system can be used to control system 10. The control system is configured to turn on and turn off the system, control the activation and deactivation of the scrubbing components, activation and deactivation of the collection system, activation and deactivation of spraying and/or dispensing systems, the more. The control system, in this embodiment, includes a durable housing for tough work environments and in order to be durable for dropping, transportation, and the like.

Other Components Included in Alternative Embodiment:

In the arrangement shown, as one example additional features including a cleaning solution and recovered solution tanks, a plurality of these tanks, a vacuum motor, a plurality of vacuum hoses, and fill ports. In an alternative embodiment, as one example, the fill port and other features are separated from the cleaning head so that the features can be used for internal and external cleaning heads. Furthermore, this modular system provides for ease and efficiency in relocating a system throughout a tower or other structure, as well as other movements between structures, transport, disassembly, assembly, and the like. Said another way, this modular configuration provides for ease in moving throughout various decks of a structure, as well as through doorways and the like. Said another way, this modular arrangement of system 10 provides for a small cross section so that the system can fit through small openings and the like.

Obstacle Detection Processor:

In the arrangement shown, as one example, system 10 includes an obstacle detection processor (or "detection processor"). Obstacle detection processor is configured to detect obstacles and/or obstructions on surfaces. Obstacle detection processor is a processor configured of a plurality of inputs (or an "input layer"), in which multiple surfaces and/or obstacles and a patterned arrangement is detected and regularly, at a time interval, re-checked and rescanned using lasers and/or a LIDAR system. In this way, a general pattern is created along a wall shape and/or surface that forms an encoded layer, a layer recognizable to the obstacle detection processor.

Application Server:

In the arrangement shown, as one example, system 10 comprises remote servers, databases, and/or computers that fulfill the functions disclosed and described herein. In the embodiment depicted, system 10 comprises an application server. Application server comprises one or more computer systems adapted to transmit and receive data regarding selected datasets related to various users and/or datasets related to multiple users. Application server is adapted to query databases with unique identification codes to retrieve image information and associated surface information related to various surfaces system 10 has moved over and/or through and gathered data in, and/or has monitored and/or is monitoring.

Application server may transmit environmental data and/or surface related documents with respect to a single environment and/or multiple environments. Application server is also adapted to query a database. This query includes receiving and sending surface identification and environmental data. Additionally, application server may communicate with a cloud computing system or a mobile application, which can also be adapted to present the data in a form conducive to being viewed on a mobile device and/or handheld device.

As one of ordinary skill in the art may understand, application server, database, and other databases mentioned herein may be implemented in one or more servers. Furthermore, each may be on multiple servers to increase system efficiency, especially when handling large data gathering, following extended guidelines, extended ranges, ranges discussed herein. Additionally, multiple servers may have mirrored data to prevent data loss in case of disk failure and/or to decrease access and response times for database queries. In alternative embodiments, application server, and other database procedures may be carried out on computer-readable instructions and data stored on the customer's mobile computing device.

Hosting and Facilitating the Scrub Head:

In the arrangement shown, as one example, both an internal unit and an external unit are configured to aid in the operation of system 10.

Internal Unit: In the arrangement shown, as one example, system 10 includes an internal unit. Internal unit is formed of any suitable size, shape, and design and is configured to aid in the hoisting, operation of and positioning of the system and the cleaning head of the system to cause efficient operation of system 10. In the arrangement shown, as one example, the internal unit includes a remote controlled hoist which is positioned near and above the cleaning head unit. In this way, the balance and lifting point is also located specifically away from the cleaning head which aids in internal cleaning. Additionally, system 10 is configured with interior walls which have a slight negative angle. This slight negative angle, in accordance with the location of the lift and/or hoist position, causes the cleaning head to rest against the surface with an ideal pressure. Furthermore, the positioning and design causes inherent stability. Furthermore, these features, in concert with the switchable magnet base, provide optimized operation of the cleaning head and other systems herein.

External Unit: In the arrangement shown, as one example, system 10 includes an external unit. External unit is formed of any suitable size, shape, and design and is configured to to provide for an operator to ride in tandem with the cleaning head on the exterior area of the structure and/or interior areas of the structure and/or tower. In the arrangement shown, as one example, the external is configured on the front of a small wing and/or platform and/or suspended platform. In this way, an operator can ride with the cleaning head. Furthermore, in this way, the operator can manually apply or retract the cleaning head using a lever. While the platform is included in this arrangement, as one example, another embodiment does not have nor does it require this platform.

In addition to the above identified features, options, controls, and components, system 10 may also include other features and functionalities, among other options, controls, and components.

In Operation:

In one example, and in the arrangement shown, system 10 is designed to communicate, clean, and recover. In the arrangement shown, as one example, system 10 is configured to operate by battery power and clean a surface while communicating remotely with an operator or onboard computing system. In this example, the system includes an onboard solution tank which carries cleaning solutions to be applied, scrubbed, and recovered. The solution can be refilled with ease.

In this way, the system 10 operates by electric motors, scrub plates, spreader bars, gimbals, spring loaded arms, squeegees, and vacuum recovery hoses. Pressure is placed on the assembly evenly and the pads scrub while the squeegees wipe the surface clear of debris and other contaminants.

In operation, squeegees, scrub pads and the like may need to be replaced and various quick attachment features are designed to allow for quick, on site replacement of these components as well as quick on-site replacement of batteries, recharging of batteries, reloading of cleaning solution, as well as discharge of dirty and/or used solution and other contaminants collected, such as airborne contaminants and hard contaminants as might be collected in the vacuum system.

As one example, the cleaning vehicle 19 is lifted up the tower or vertical surface using a rope connected to the cleaning vehicle. The system can be manually operated and/or remotely controlled in addition to autonomous operation.

As another example, in operation the cleaning vehicle 19 applies a small amount of cleaning solution to a surface, scrubs the surface with the cleaning solution through electronically driven scrub pads and/or brushes, directs fluid for collection, squeegees or removes fluid and contaminants while vacuuming the used fluid and other contaminants into a holding tank, simultaneously. In other words, all of these functions are performed simultaneously while the system deflects and detects obstacles and/or incongruencies in a surface. Similarly, all of these functions are performed while the cleaning vehicle moves over the surface.

It will be appreciated by those skilled in the art that other various modifications could be made to the system, process, and method of use without parting from the spirit and scope of this disclosure. All such modifications and changes fall within the scope of the claims and are intended to be covered thereby.

What is claimed:

1. A surface cleaning system, comprising:
    a cleaning vehicle;
        a frame;
            the frame extending a length from a first end of the frame to a second end of the frame;
            wherein the frame is configured to support features and components of the surface cleaning system;
        a power supply;
        a dispensing system;
            the dispensing system having a plurality of storage tanks;
            the dispensing system having a plurality of dispensing hoses;
            the dispensing system causing a cleaning agent to be dispensed from the plurality of dispensing hoses;
                wherein the dispensing system causes the cleaning agent to be applied to a surface;
        a collection system;
            the collection system having a collection tank;
            the collection system having a diverter;
            the collection system having a collection hose;
            the collection system having a pump;
                wherein the pump is operably connected to the collection hose; wherein the operable connection includes a hose connection such that the pump causes a fluid to move through the hose; wherein the fluid includes the cleaning agent which was applied to the surface and contaminants being removed from the surface;
                wherein the pump causes suction;
                wherein the diverter causes contaminants and the fluid to move to an entry point of the collection hose;
                wherein the pump causes the fluid to move through the collection hose and into the collection tank;
                wherein the pump and the collection hose collect contaminants in the collection tank;
        a wheel;
            the wheel having an adjustment feature;

wherein the adjustment feature causes the wheel to move to various settings in proximity to the surface;
a cleaning assembly;
the cleaning assembly having at least one scrub pad;
the cleaning assembly having a scrub plate system;
wherein the scrub plate system includes at least one scrub pad and at least one scrub pad mount; wherein the at least one scrub pad is mounted to the at least one scrub pad mount; wherein the at least one scrub pad mount is attached to the cleaning assembly;
wherein the surface cleaning system cleans a substantially vertical surface
wherein the wheel is a magnetic wheel;
wherein the magnetic wheel is switchable;
wherein switchable means the magnetic wheel can be activated and deactivated.

2. The system of claim 1, further comprising:
the cleaning vehicle having a shroud;
the shroud extending a length from a first end of the shroud to a second end of the shroud;
the shroud having a top and a bottom;
the shroud having an interior surface and an exterior surface;
wherein the shroud forms a covering over interior components of the cleaning system.

3. The system of claim 1, further comprising:
the frame having a plurality of supports in approximate parallel space relation to one another.

4. The system of claim 1, further comprising:
wherein the power supply is a corded power supply.

5. The system of claim 1, further comprising:
wherein the power supply is an onboard power supply.

6. The system of claim 1, further comprising:
wherein the power supply is an onboard power supply;
wherein the onboard power supply is a plurality of batteries.

7. The system of claim 1, further comprising:
wherein activating the magnetic wheel is causing the magnetic wheel to engage with the surface through magnetic forces; wherein deactivating the magnetic wheel is causing the magnetic wheel to disengage with the surface through magnetic forces.

8. The system of claim 1, further comprising:
the wheel having a plurality of rotors;
each of the plurality of rotors having curved edges;
wherein the curved edges of the wheel prevent the wheel from scratching or damaging a surface of a structure.

9. The system of claim 1, further comprising:
wherein the wheel is switchable, having an engaged position and a disengaged position;
wherein the engaged position is an engaged activation in which the wheel engages a surface;
wherein the disengaged position is a disengaged activation in which the wheel disengages the surface.

10. The system of claim 1, further comprising:
the wheel having a plurality of rotors;
each of the plurality of rotors having curved edges;
wherein the curved edges of the wheel prevent the wheel from scratching or damaging a surface of a structure
the wheel having a mount system;
wherein the mount system is a plurality of springs.

11. The system of claim 1, further comprising:
a plurality of attachments;
wherein the plurality of attachments are configured to hold the features and components of the cleaning system together.

12. The system of claim 1, further comprising:
a plurality of wire connections.

13. The system of claim 1, further comprising:
an onboard computing system.

14. The system of claim 1, further comprising:
an obstacle detection system;
the obstacle detection system having at least one scanner;
the obstacle detection system having a processor;
wherein the scanner detects obstacles of the surface;
wherein the processor causes adjustments of the cleaning system to handle obstacles depending on a set of obstacle parameters.

15. An irregular surface cleaning system,
a cleaning vehicle;
the cleaning vehicle having a shroud;
the shroud extending a length from a first end of the shroud to a second end of the shroud;
the shroud having a top and a bottom;
the shroud having an interior surface and an exterior surface;
wherein the shroud forms a covering over interior components of the cleaning system;
a frame;
the frame extending a length from a first end of the frame to a second end of the frame;
the frame having a plurality of supports in approximate parallel space relation to one another;
a power supply;
a dispensing system;
the dispensing system having a plurality of storage tanks;
the dispensing system having a plurality of dispensing hoses;
the dispensing system causing a cleaning agent to be dispensed from the plurality of dispensing hoses;
wherein the dispensing system causes the cleaning agent to be applied to a surface;
a collection system;
the collection system having a collection tank;
the collection system having a diverter;
the collection system having a collection hose;
the collection system having a pump;
wherein the pump is operably connected to the collection hose; wherein the operable connection includes a hose connection such that the pump causes a fluid to move through the hose; wherein the fluid includes the cleaning agent which was applied to the surface and contaminants being removed from the surface;
wherein the pump causes the fluid to move through the collection hose and into the collection tank;
wherein the diverter causes contaminants to move to an entry point of the collection hose;
wherein the pump and the collection hose collect contaminants in the collection tank;
a plurality of wheels;
wherein the wheels are configured to guide the cleaning vehicle;
a scrubber assembly;
the scrubber assembly having a scrub pad;
the scrubber assembly having a scrub pad mounting system;
wherein the irregular surface cleaning system is configured to move up and down in a substantially vertical orientation so as to cause a substantially vertical surface to be cleaned;

wherein the irregular surface cleaning system is configured to move horizontally across a substantially vertical surface, so as to clean a substantially vertically oriented surface.

16. The system of claim 15, further comprising:
wherein the diverter is a plurality of wiper blades;
   each of the plurality of wiper blades attached to a wiper arm;
   each of the wiper arms secured to a wiper mount;
   wherein each of the wiper mount is configured to engage each of the plurality of wipers against the surface;
   wherein each of the plurality of wiper blades is configured to remove the cleaning agent and contaminants from the surface.

17. The system of claim 15, further comprising:
wherein each of the plurality of wheels magnetically engages the surface;
a magnetic switch;
   wherein the magnetic switch engages and disengages the activation of the magnetism of each of the plurality of wheels;
each of the wheels having a mount system.

18. The system of claim 15, further comprising:
a plurality of attachments;
   wherein the plurality of attachments are configured to hold features and the components of the cleaning system together;
a plurality of wire connections.

19. The system of claim 15, further comprising:
an onboard computing system;
a communications and control system;
an obstacle detection system;
an application server.

* * * * *